United States Patent

[11] 3,633,002

[72] Inventors Joe B. Dendy;
 Sam P. Liden, both of Phoenix, Ariz.
[21] Appl. No. 1,654
[22] Filed Jan. 9, 1970
[45] Patented Jan. 4, 1972
[73] Assignee Sperry Rand Corporation

[54] INTEGRATOR FOR USE IN DIGITAL DIFFERENTIAL ANALYZER SYSTEMS
 18 Claims, 11 Drawing Figs.
[52] U.S. Cl. ..................................................235/150.31,
 235/152
[51] Int. Cl. ...................................................... G06j 1/02,
 G06f 15/32
[50] Field of Search........................................... 235/152,
 150.31, 183

[56] References Cited
 UNITED STATES PATENTS
 3,204,088 8/1965 Adams et al. .................. 235/152
 OTHER REFERENCES
 Palevsky, Preceedings of the I.R.E., Oct. 1953, pgs. 1352–1356 (235/152)-(DDA Pub).

Control Engineering, Sept. 1957, Vol. 4, pg. 173 (235/152)-(DDA Pub).

*Primary Examiner*—Eugene G. Botz
*Assistant Examiner*—James F. Gottman
*Attorney*—S. C. Yeaton

ABSTRACT: An integrator employing a trapezoidal integration algorithm for use in digital differential analyzer systems. Reversible computation is achieved with respect to each integrator of the system as well as with respect to the inter-connected system of integrators by utilizing a two-interval computation cycle for each iteration of the computation. During the first interval, rectangular integration is performed wherein the $Y$-quantity is combined with the $R$-quantity in accordance with the $dx$- input signal thereby providing $dz$-overflow signals. During the second interval a trapezoidal correction quantity is algebraically added to the $R$-quantity, the correction quantity having a numerical value of $\frac{1}{2} dx \cdot dy$. The $dx$- and $dy$- quantities utilized in computing the trapezoidal correction quantities are undelayed with respect to the iteration being performed since the $dx$- and $dy$- quantities are provided by the $dz$- outputs of the interconnected integrators of the system, the $dz$- outputs being provided during the first interval of the computation cycle.

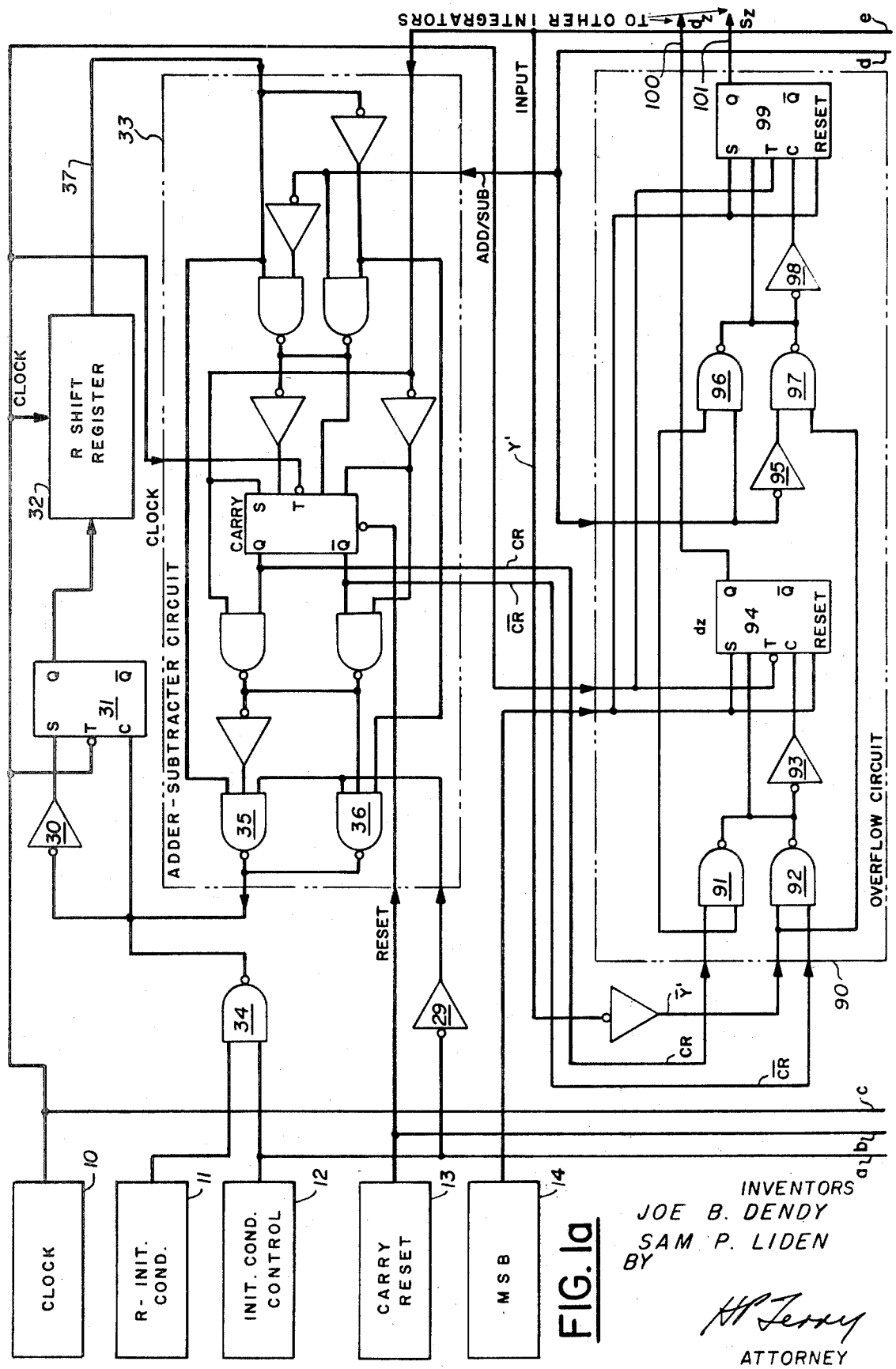

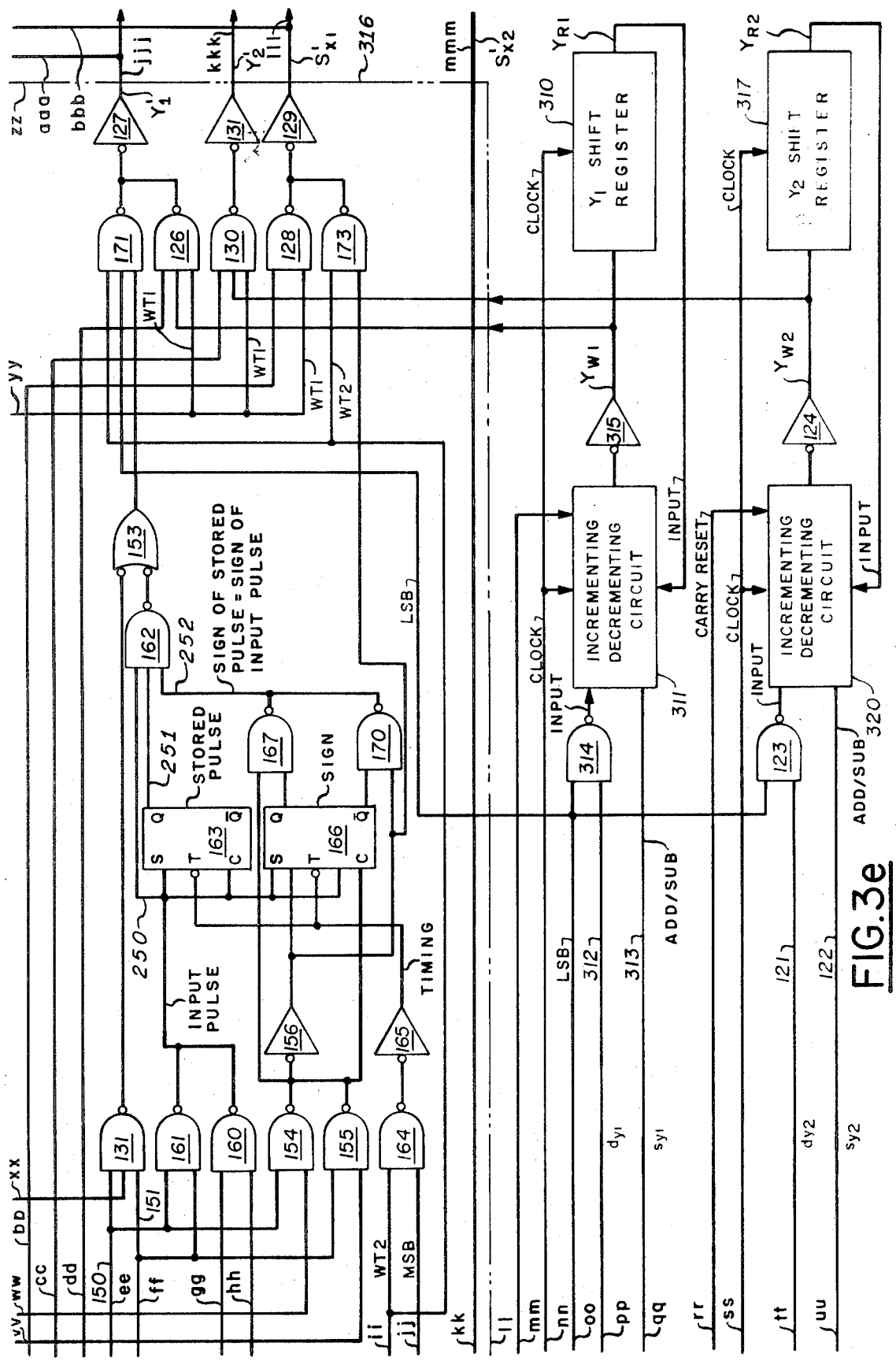

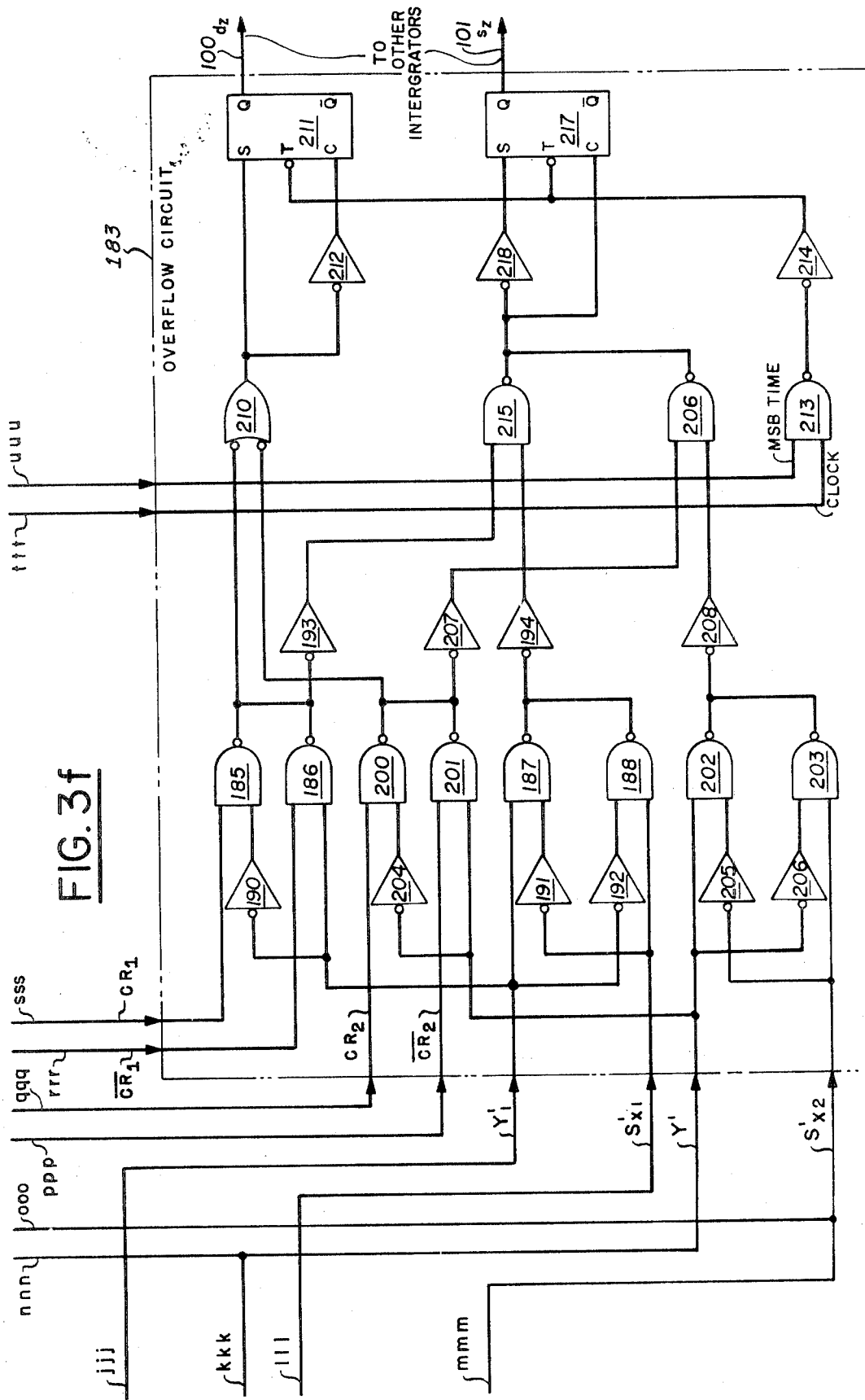

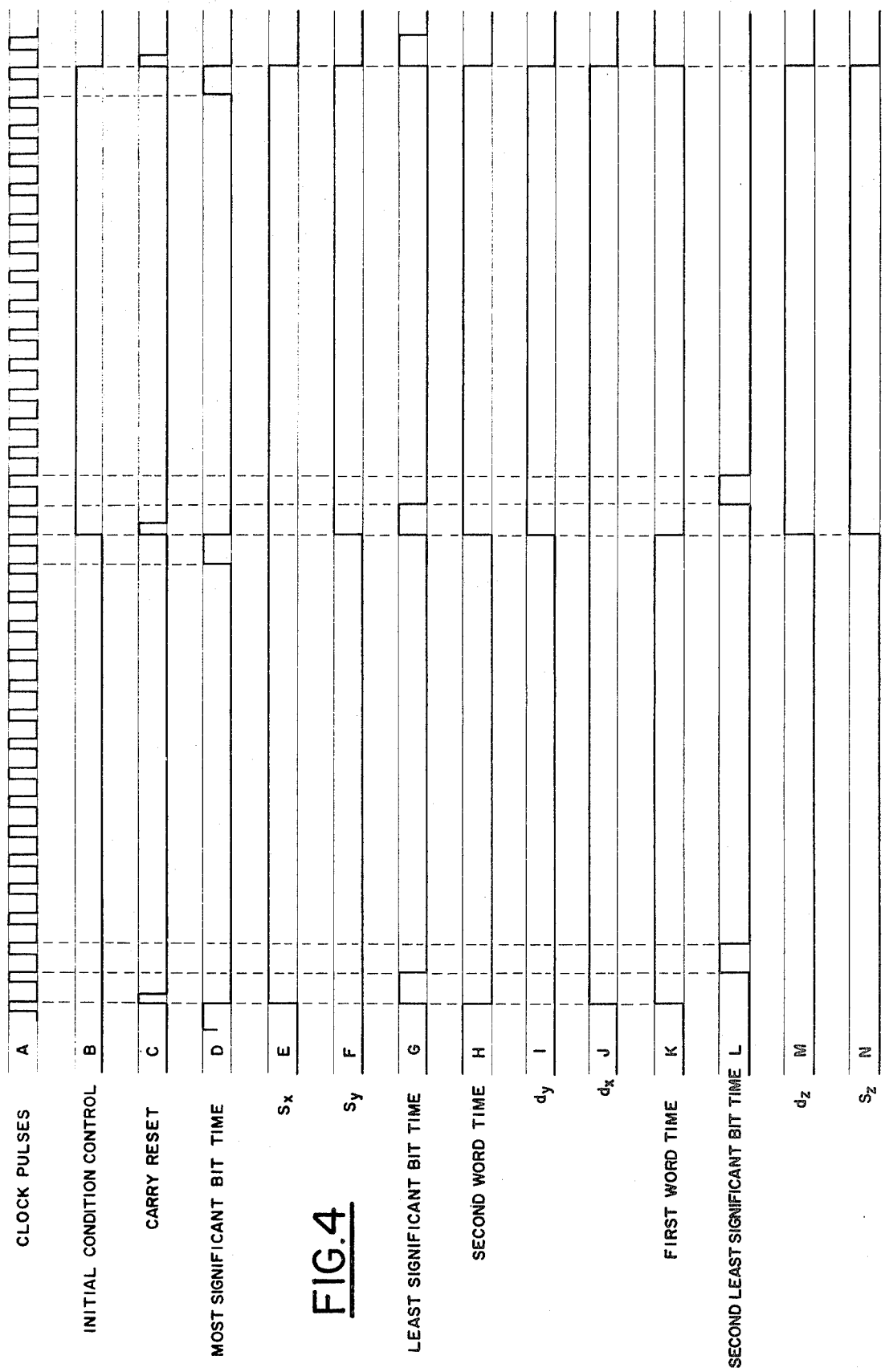

3,633,002

INTEGRATOR FOR USE IN DIGITAL DIFFERENTIAL ANALYZER SYSTEMS

BACKGROUND OF THE INVENTION

1. Field of the Invention

The present invention pertains to integrators for use in digital differential analyzer computation systems. For convenience of notation, the term digital differential analyzer will hereinafter be denoted as DDA.

2. Description of the Prior Art

A problem commonly encountered in DDA computation systems is that of irreversibility of computation. A computation is said to be irreversible if the dependent variable of the computation assumes two different sequences of values when the independent variable of the computation assumes, respectively, a sequence of values first in one direction and then in the reverse direction returning to the value from which it started. The dependent variable therefore erroneously assumes two different values for the same value of the independent variable. Such DDA systems tend to drift from the true solution as the sign of the independent variable of the computation is continuously reversed throughout the iterations performed in solving the problem. One of the known causes of irreversibility in prior art DDA systems utilizing conventional rectangular integration algorithm is the quantization of data inherent in this algorithm. As well as being irreversible, such systems tend to be inaccurate due to the roundoff error associated with the rectangular integration algorithm. In an attempt to improve the accuracy of DDA systems and to reduce the drift of the systems from the true solutions due to the irreversibility phenomenon, the trapezoidal integration algorithm has been implemented in prior art systems. The trapezoidal integration algorithm requires that a correction term equal to $\frac{1}{2}dxdy$ be algebraically added to the integrand during each iteration of the computation. Although utilization of the trapezoidal integration algorithm has improved the accuracy of prior art DDA systems with respect to those utilizing the rectangular integration algorithm, these systems utilizing the trapezoidal integration algorithm were still found to be irreversible. These systems were irreversible since the $dx$- and $dy$-inputs to each integrator of the system, from which the trapezoidal correction quantity is computed, are provided by other integrators in the interconnected system of integrators. Therefore, a $dz$-output of an integrator provided during a particular iteration of the computation is provided to the $dx$- and $dy$-inputs of other integrators of the system during the next following iteration. Therefore, since the trapezoidal correction quantity is computed from $dx$- and $dy$-increments that may be one or more iterations delayed with respect to the iteration being performed, incorrect trapezoidal quantities may be added into the integrand causing the system to drift from the true solution.

In addition to being irreversible prior art DDA systems utilizing the trapezoidal integration algorithm tend to introduce inaccuracies into the computation since the trapezoidal correction quantities are computed from delayed data and therefore may be inaccurate.

Additionally, prior art DDA integrators utilizing the trapezoidal integration algorithm required three arithmetic units to perform the required computations. One arithmetic unit was required to increment the Y-quantity. The second arithmetic unit was required to combine the Y-quantity with the R-quantity and the third arithmetic unit was required to add the trapezoidal correction quantity to the R-quantity.

SUMMARY OF THE INVENTION

The present invention provides a reversible DDA integrator that is more accurate than prior art integrators and in addition requires less equipment than the prior art configurations.

The integrator, in accordance with the present invention, utilizes an integration algorithm wherein each computation cycle or iteration is comprised of at least two intervals. During the first interval rectangular integration is performed wherein the Y-quantity is combined with the R-quantity. During the second interval a correction quantity, for example, a trapezoidal correction quantity, is combined with the R-quantity. Since the $dz$-outputs of the integrators of the system are primarily provided at the end of the first interval, the trapezoidal correction quantities which are computed utilizing these $dz$-outputs are then undelayed with respect to the iteration being performed and therefore the computations performed utilizing the integrators of the present invention are reversible.

In addition, since the correction quantities are undelayed with respect to the iterations performed, the computations of a system instrumented in accordance with the present invention tend to be more accurate than computations of systems instrumented in accordance with a prior art trapezoidal algorithm.

Additionally, whereas prior art integrators utilizing a trapezoidal algorithm required three arithmetic units as previously explained, the integrators in accordance with the present invention require only two arithmetic units. One of the arithmetic units of the present invention is utilized during the first interval to combine the Y-quantity with the R-quantity and is furthermore utilized during the second interval to combine the trapezoidal correction quantity with the R-quantity. The other arithmetic unit of the present invention is utilized during both intervals to increment or decrement the Y-quantity in accordance with the $dy$-input.

Three species of the present invention are disclosed, each utilizing a different means for adding the trapezoidal correction quantities to the R-quantity.

BRIEF DESCRIPTION OF THE DRAWINGS

FIGS. 1a and 1b are schematic logic diagrams, partially in block form, showing an embodiment of the invention in which the trapezoidal correction quantities are added to an additional stage of the R-storage register;

FIG. 4 is a waveform timing diagram illustrating the waveforms of the control signals required for the circuits of FIGS. 1, 2, and 3.

DESCRIPTION OF THE PREFERRED EMBODIMENTS

Figure 1B:
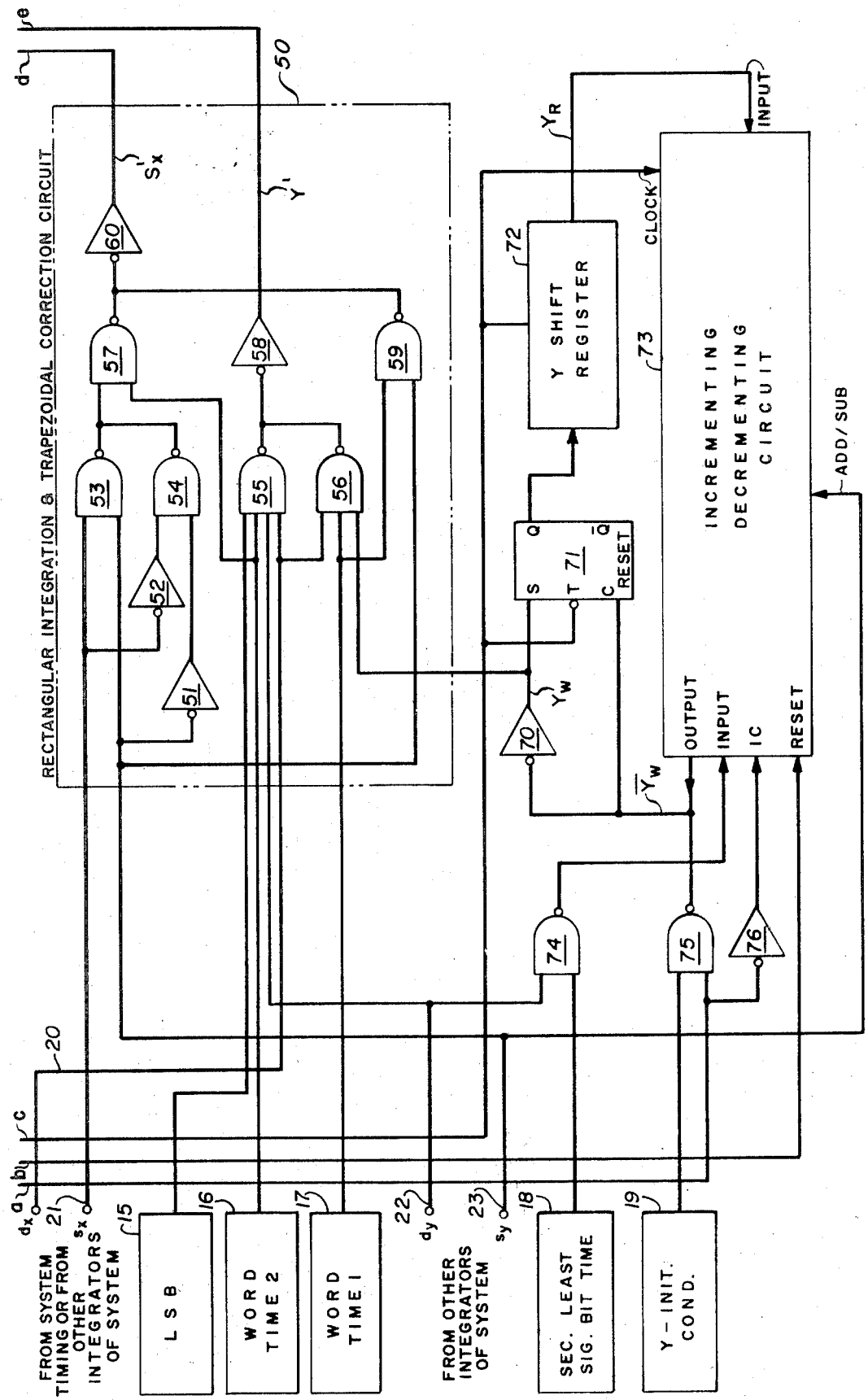
Figure 2A:
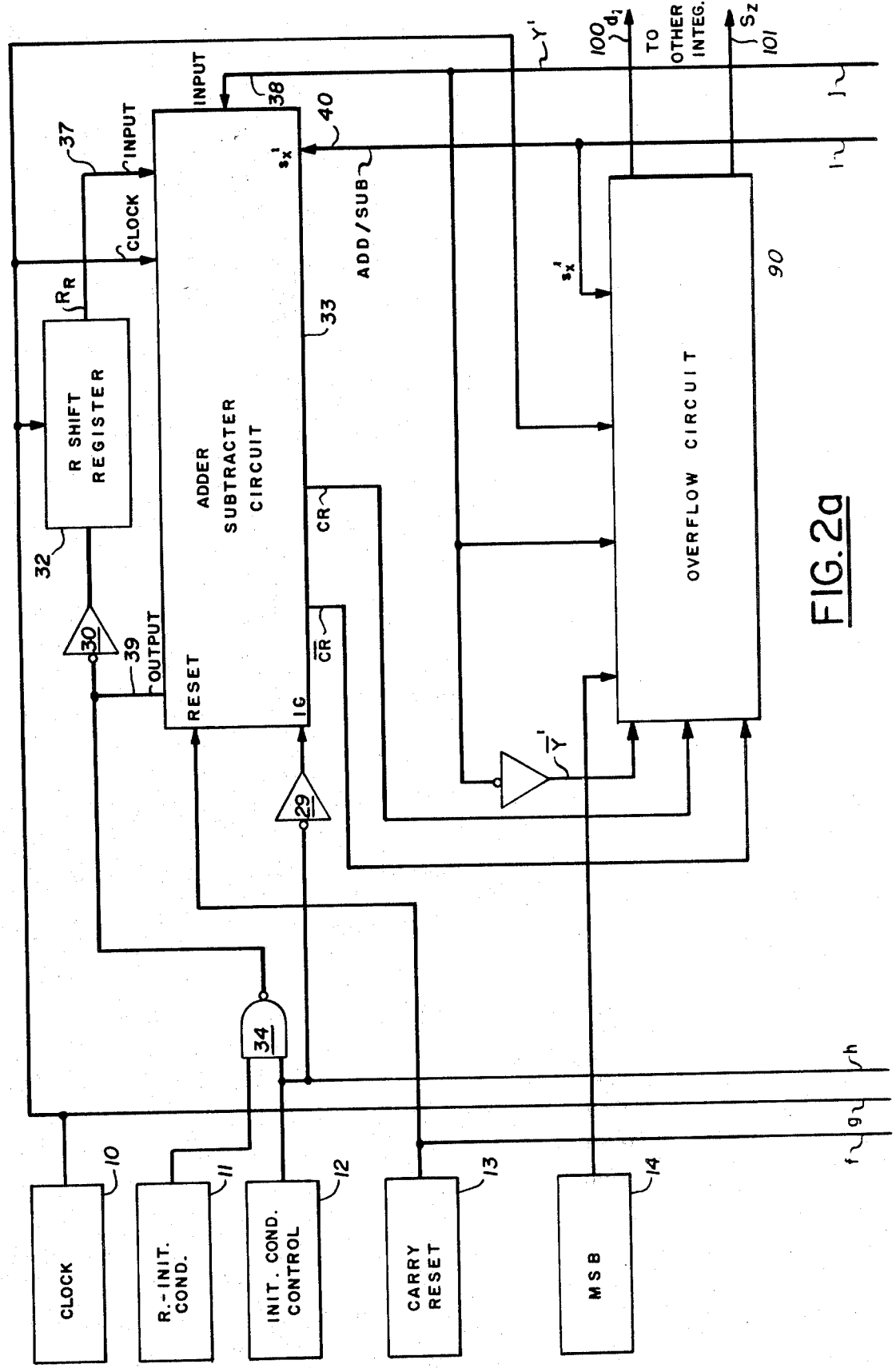
FIGS. 2a and 2b are schematic logic diagrams, partially in block form, showing another embodiment of the invention in which successive trapezoidal correction quantities are stored and combined before being added to the R-storage register.
Figure 2B:
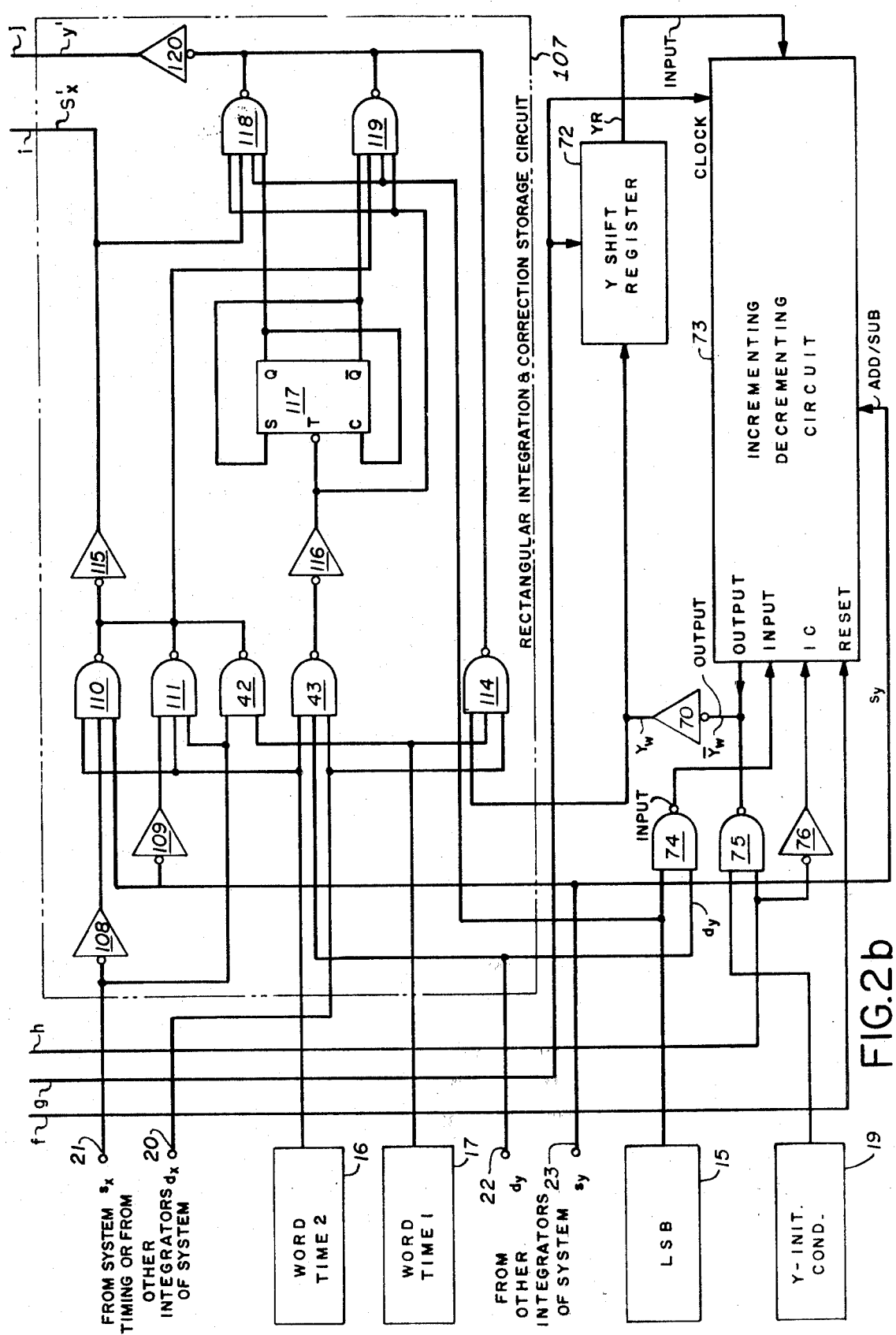
Figure 3A:
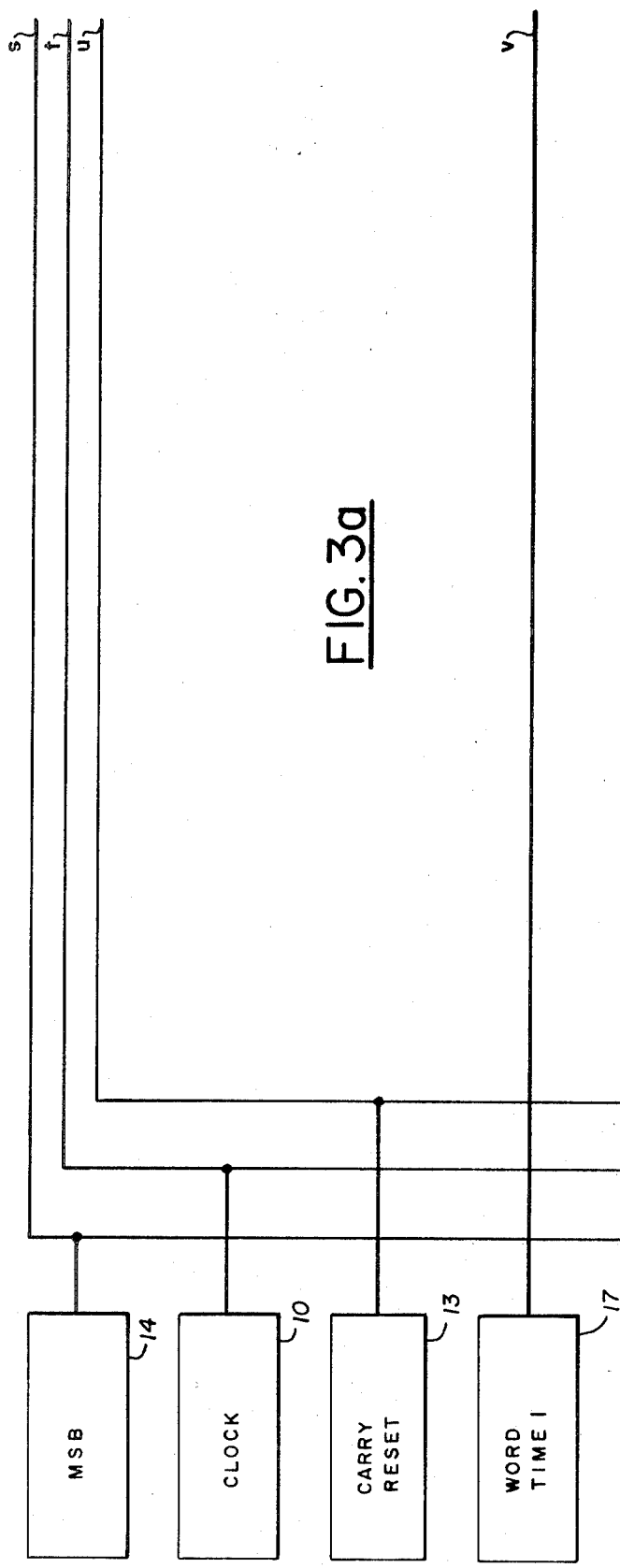
FIGS. 3a to 3b are schematic logic diagrams, partially in block form, showing yet another embodiment of the invention having multiple inputs.
Figure 3B:
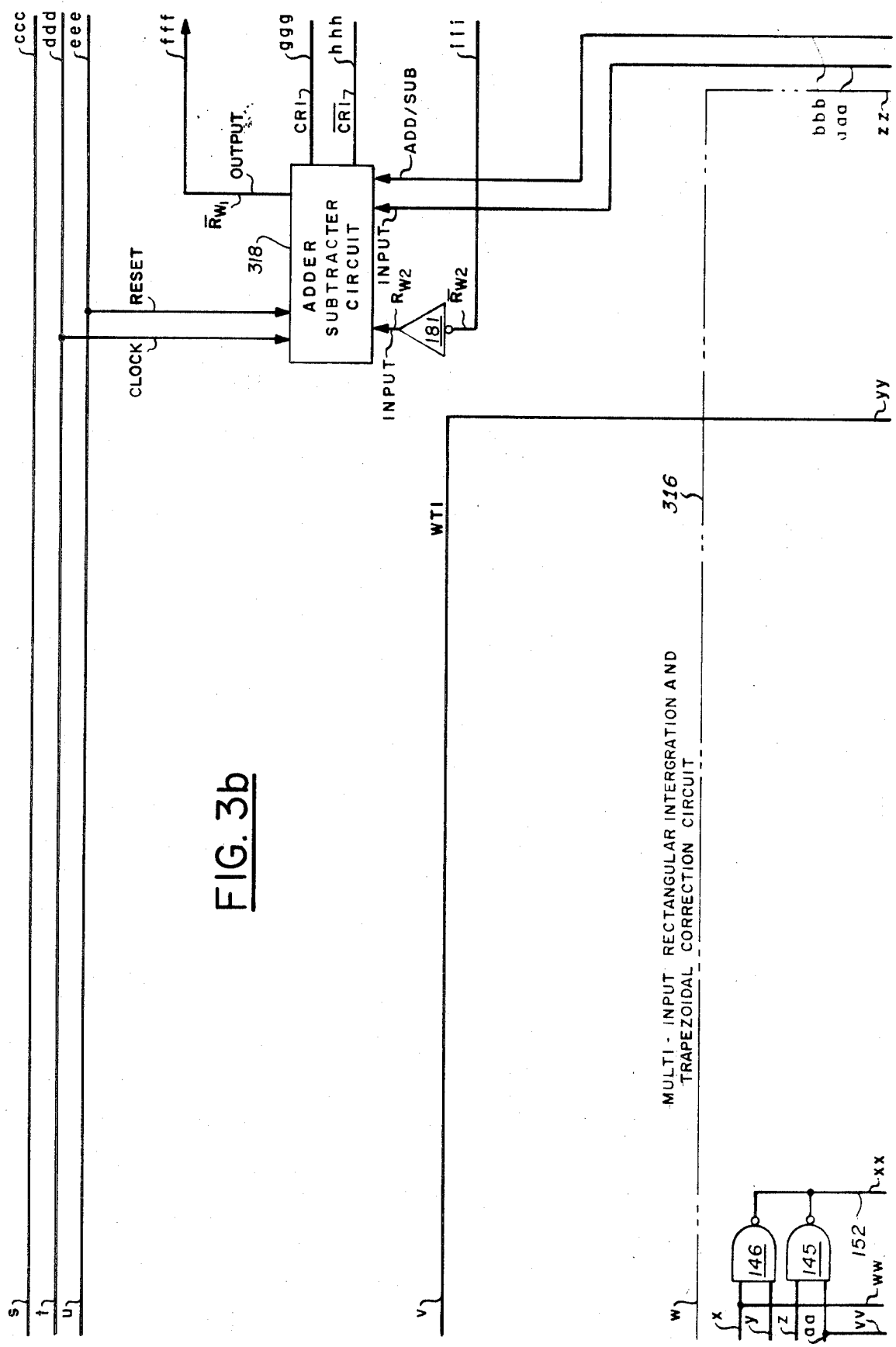
Figure 3C:
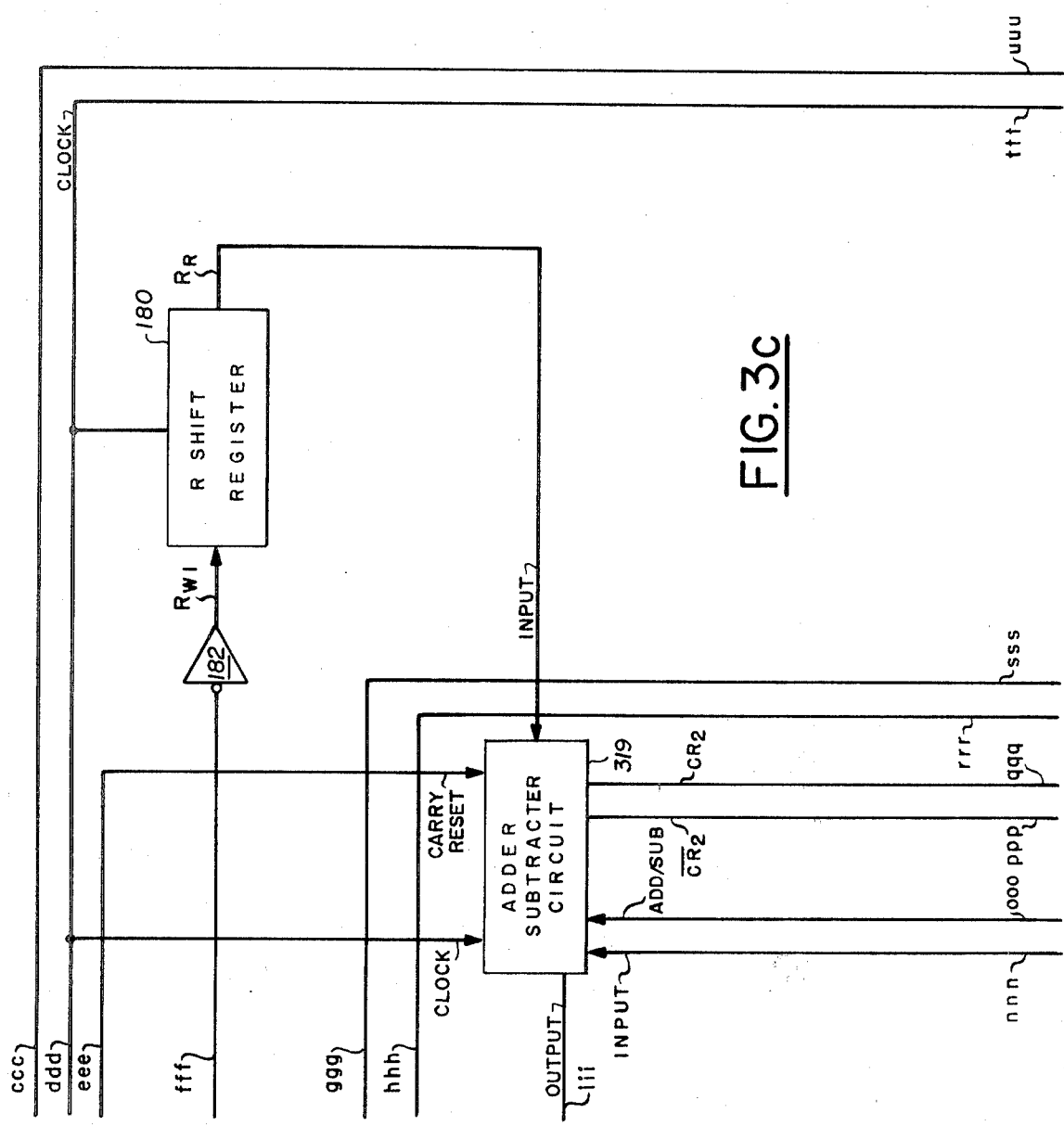
Figure 3D:
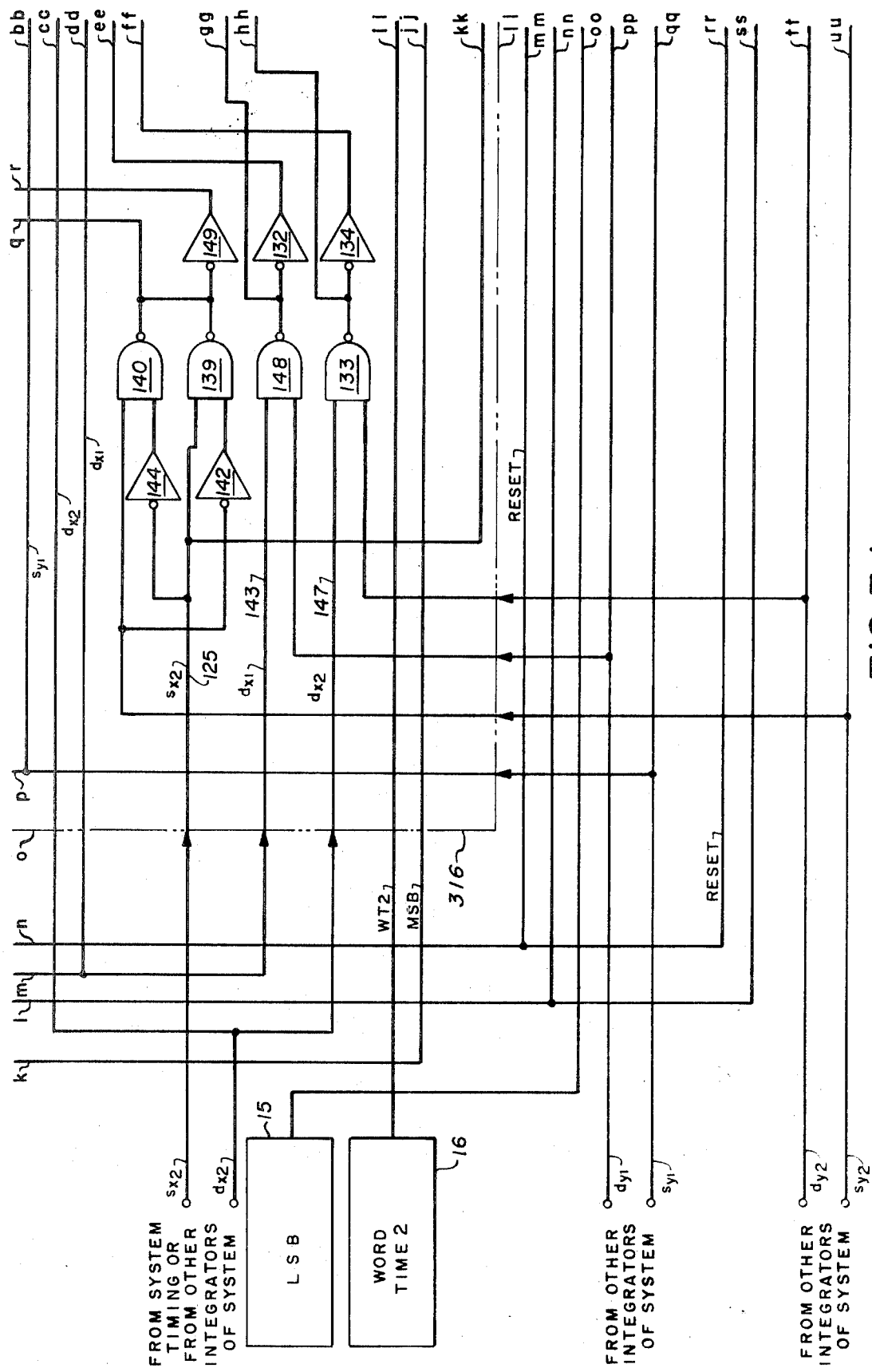

FIGS. 1, 2 and 3 illustrate three embodiments of an integrator in accordance with the present invention wherein the computation cycles therefor, each comprises two intervals. The intervals may, for example, each comprise one word time with respect to the associated R-quantities. During the first word time of a computation cycle, the Y-quantity associated with each integrator is altered in accordance with the associated $dy$-signal and the altered Y-quantity is combined with the associated R-quantity in accordance with the associated $dx$-signal. During the second word time of the computation cycle, the Y-quantity is again altered in accordance with the $dy$-signal and the trapezoidal correction quantity is added to the R-quantity.

The illustrated integrators are implemented utilizing a ternary communication system which is characterized by the use of two conductors associated with each of the $dx$-, $dy$- and $dz$-increments, which conductors convey the incremental information amongst the integrators of the computation system. The binary signal on one of the two wires is representative of the existence or absence of the associated $dx$-, $dy$- or $dz$-increment and the binary signal on the other of the two wires is representative of the sign of the associated increment.

The integrator of the present invention generally includes a Y-storage register for storing the Y-quantity. The output of the Y-storage register is generally connected as an input to an incrementing-decrementing circuit for altering the Y-quantity in accordance with the $dy$-signal. The output of the incrementing-decrementing circuit is generally coupled to the input of the Y-storage register.

The output of the incrementing-decrementing circuit is also generally coupled as an input to a rectangular integration and correction quantity circuit. The rectangular integration and correction quantity circuit together with an adder-subtractor circuit combine the Y-quantity with the R-quantity during the first word time of the computation cycle and add the trapezoidal correction quantity to the R-quantity during the second word time thereof.

The integrator of the present invention also generally includes an R-storage register for storing the R-quantity. The output of the R-storage register is generally connected as an input to the adder-subtractor circuit. The adder-subtractor circuit combines the Y-quantity with the R-quantity and adds the trapezoidal correction quantity provided by the rectangular integration and correction quantity circuit to the R-quantity. The output of the adder-subtractor circuit is generally coupled to the input of the R-storage register.

An overflow circuit, which is generally responsive to the signals provided by the adder-subtractor circuit and the rectangular integration and correction quantity circuit, provides the $dz$-output signals from the integrator. The numerical quantities associated with the integrator of the present invention may, for example, comprise binary numbers whose polarities may be represented in the well-known two's complement notation.

Referring now to FIG. 1, an embodiment of an integrator in accordance with the present invention is illustrated in which the trapezoidal correction quantities are added to an additional stage 31 of the R-shift register 32.

The Y-shift register 72, as previously explained, is included in the integrator for storing the Y-quantity which may comprise, for example, a binary number. A clock pulse source 10 connected to the shift register 72 provides the shifting pulses as illustrated by waveform A of FIG. 4, for shifting the Y-binary number therethrough.

The output signal, $Y_R$, of the Y-shift register 72 is connected as an input to the incrementing-decrementing circuit 73 to which the Y-quantity, $Y_R$, is applied in bit serial fashion in response to the shifting pulses provided by the clock pulse source 10. The bits of the Y-quantity are shifted into the incrementing-decrementing circuit 73 in the order of increasing significance. Additionally, a $dy$-signal and an $S_y$-signal, from other integrators of the system, are applied respectively via conductors 22 and 23 as inputs to the incrementing-decrementing circuit 73. The $dy$-signal is applied via a NAND-gate 74 for reasons to be explained. The existence or absence of a $dy$-increment during a computation cycle is determined, as previously explained, by the binary state of the $dy$-signal present on the conductor 22 during the computation cycle. A binary ONE or a binary ZERO signal on the conductor 22 is determinant of the existence or absence thereof respectively. The $S_y$-signal is representative of the sign of the $dy$-increment which sign is positive or negative in accordance with the $S_y$-signal being in the binary ZERO state or the binary ONE state respectively.

A second least significant bit time pulse source 18 provides the control signal, as illustrated by waveform L of FIG. 4, to the NAND-gate 74 to which the $dy$-input signal is also applied. The second least significant bit time pulse source 18 controls the numerical significance of the $dy$-increment or decrement combined with the Y-quantity by the circuit 73 in a manner to be described. The clock pulse source 10, connected generally to the incrementing-decrementing circuit 73 provides control signals thereto, as illustrated by waveform A of FIG. 4.

The incrementing-decrementing circuit 73 combines the $dy$-increment with the Y-quantity, $Y_R$, during a computation cycle, in accordance with the $dy$ and $S_y$-signals. When the $S_y$-signal is representative of the positive sign during the computation cycle, the $dy$-increment is added to the Y-quantity and when the $S_y$-signal is representative of the negative sign during the computation cycle, the $dy$-increment is subtracted therefrom. When the $dy$-signal is representative of the absence of a $dy$-increment, the Y-quantity remains unaltered. The addition or subtraction of the $dy$-increment with respect to the Y-quantity may be performed in bit serial fashion in a conventional manner.

A Y-register initial condition pulse source 19 provides initializing signals via NAND-gate 75 to the Y-shift register 72. An initial condition control pulse source 12 provides an initial condition control signal, as illustrated by waveform B of FIG. 4 to the NAND-gate 75 and via an inverter 76 to the incrementing-decrementing circuit 73 for reasons to be explained.

The incrementing-decrementing circuit 73 provides a $\bar{Y}_W$-signal representative of the combined Y-quantity and $dy$-increment. The $\bar{Y}_W$-signal is applied directly and via an inverter 70 to a flip-flop 71 which provides the Y-quantity signal, in bit serial fashion, to the input of the Y-shift register 72.

The incrementing-decrementing circuit 73 comprises, for example, a conventional serial circuit identical to the adder-subtractor circuit 33 to be discussed.

The $Y_W$-signal provided by the incrementing-decrementing circuit 73 via the inverter 70 is applied as an input to the rectangular integration and trapezoidal correction circuit 50. The rectangular integration and trapezoidal correction circuit 50, together with the adder-subtractor circuit 33, as previously explained, perform rectangular integration with respect to the Y- and R-quantities during the first word time of the computation cycle and add a trapezoidal correction quantity to the R-quantity during the second word time thereof. A $dx$-signal and an $S_x$-signal are applied via conductors 20 and 21 as inputs to the rectangular integration and trapezoidal correction circuit 50. The $dx$ and the $S_x$-signals are provided either from the system timing signal source, as indicated by the legend, or from other integrators of the system depending on the function performed by the integrator in the computation. The existence or absence of a $dx$-increment, during a computation cycle, is determined by the binary state of the $dx$-signal present on the conductor 20 during the computation cycle. A binary ONE or a binary ZERO signal on the conductor 20 is determinant of the existence or absence thereof respectively. The $S_x$-signal is representative of the sign of the $dx$-increment which sign is positive or negative in accordance with the $S_x$-signal being in the binary ZERO state or the binary ONE state respectively. A first word time pulse source 17 provides a control signal, as illustrated by waveform K of FIG. 4, to the rectangular integration and trapezoidal correction circuit 50.

During the first word time of the computation cycle, the rectangular integration and trapezoidal correction circuit 50 provides a $Y'$-signal, as indicated by the legend, representative of the rectangular integration function $Y_W dx$. The circuit 50 includes a NAND-gate 56 which is responsive to the first word time pulse source 17, the $Y_W$-signal and the $dx$-signal and provides the $Y'$-signal during the first word time via an inverter 58 in a manner to be explained.

The rectangular integration and trapezoidal correction circuit 50 also provides an $S_x'$-signal, which during the first word time is representative of the $S_x$-signal. The $S_x'$-signal provides a control function for the adder-subtractor circuit 33 during the first word time. When the $S_x'$-signal is in the binary ZERO state, the adder-subtractor circuit 33 algebraically adds the Y-quantity to the R-quantity. When the $S_x'$-signal is in the binary ONE state, the circuit 33 algebraically subtracts the Y-quantity from the R-quantity. A NAND-gate 59 responsive to the first word time pulse source 17 and the $S_x$-signal, during the first word time, provides the $S_x'$-signal via an inverter 60, in a manner to be explained.

The $dy$-signal and the $S_y$-signal, which have been previously described, are applied respectively via the conductors 22 and 23 as inputs to the rectangular integration and trapezoidal correction circuit 50. A second word time pulse source 16 and least significant bit time pulse source 15 provide control signals, as illustrated by waveforms H and G respectively of FIG. 4, to the circuit 50. The Y'-signal provided during the second word time of the computation cycle by the rectangular integration and trapezoidal correction circuit 50 is representative of the trapezoidal correction quantity ½·dx·dy and is derived in a manner to be explained. The $S_x'$-signal provided during the second word time by the circuit 50 is representative of the sign of the trapezoidal correction. The trapezoidal correction quantity is positive when the $S_x'$-signal is in the binary ZERO state or is negative when the $S_x'$-signal is in the binary ONE state. The $S_x'$signal is provided by the rectangular integration and trapezoidal correction circuit 50, in a manner to be explained.

Referring still to the circuit 50, a NAND-gate 55, responsive to the least significant bit time pulse source 15, the second word time pulse source 16, the dy-signal and the dx-signal, provides the Y'-signal during the second word time via an inverter 58. The Y'-signal during the second word time, as previously explained, is representative of the trapezoidal correction function ½·dx·dy. The numerical values of the dx- and dy-increments are unity with respect to the R-quantity as will be further explained hereafter. The timing associated with the least significant bit time pulse source 15 provides the one-half factor of the trapezoidal correction function in a manner to be explained.

The $S_x'$-signal provided during the second word time represents the sign of the trapezoidal correction quantity, as previously explained, and is provided via an inverter 60 by means of inverters 51 and 52 and NAND-gates 53, 54 and 57. The $S_x'$-signal, during the second word time, is representative of the Boolean expression $(S_x \cdot \overline{S_y} + \overline{S_x} \cdot S_y)$. This Boolean expression is logically descriptive of the conditions wherein the $S_x'$-signal is in the binary ZERO state, which represents the positive sign, whenever the $S_x$-signal and the $S_y$-signal represent the same sign with respect to each other; or the $S_x'$-signal is in the binary ONE state, which represents the negative sign, whenever the $S_x$-signal and the $S_y$-signal represent different signs with respect to each other.

The NAND-gate 53 is responsive to the $S_x$-signal and the $S_y$-signal and the NAND-gate 54 is responsive thereto via the inverters 52 and 51, respectively. The output signals of the NAND-gates 53 and 54 are applied to the NAND-gate 57 via a wired AND configuration. The second word time pulse source 16 is also connected as an input to the NAND-gate 57. The output signal of the NAND-gate 57 provides the $S_x'$-signal via the inverter 60 during the second word time of the computation cycle. The $S_x'$-signal during the second word time is representative of the described Boolean function.

The R-shift register 32 as previously explained, is included in the integrator of the present invention for storing the R-quantity which comprises, for example, a binary number. The clock pulse source 10, connected to the shift register 32, provides the shifting pulses as illustrated by waveform A of FIG. 4, for shifting the R-binary number therethrough.

The output, $R_R$, of the R-shift register 32 is connected as an input to the adder-subtractor circuit 33 to which the R-quantity, $R_R$, is applied in bit serial fashion in response to the shifting pulses provided by the clock pulse source 10. The bits of the R-quantity are shifted into the adder-subtractor circuit 33 in the order of increasing significance. The rectangular integration and trapezoidal correction circuit 50 provides the Y'-signal and the $S_x'$-signal as inputs to the adder-subtractor circuit 33 as previously explained. The Y' signal comprises, for example, a binary number and is provided to the adder-subtractor circuit 33 in bit serial fashion in the order of increasing bit significance.

During the first word time of the computation cycle, the adder-subtractor circuit 33 combines the Y'-signal with the R-signal in conventional serial arithmetic fashion. The $S_x'$-signal determines whether the Y'-signal is added to the R-signal or subtracted therefrom. The Y'-signal is added to the R-signal when the $S_x'$-signal is ZERO and is subtracted therefrom when the $S_x'$-signal is ONE.

During the second word time of the computation cycle, the adder-subtractor circuit 33 combines the Y'-signal, which during the second word time represents a trapezoidal correction quantity, with the R-quantity in conventional serial arithmetic fashion. The trapezoidal correction quantity is combined with the R-quantity in accordance with the $S_x'$-signal, which during the second word time is representative of the sign of the trapezoidal correction quantity. The trapezoidal correction quantity is added to the R-quantity when the $S_x'$-signal is ZERO and is subtracted therefrom when the $S_x'$-signal is ONE.

The adder-subtractor circuit 33 provides an $\overline{R}_W$-signal representative of the combined Y'-signal and R-signal. The $\overline{R}_W$-signal is applied directly and via an inverter 30 to a flip-flop 31 which provides the R-quantity signal, in bit serial fashion, to the input of the R-shift register 32. The adder-subtractor circuit 33 also provides a signal, $C_R$, representative of the carry produced either during the first word time or the second word time of the computation cycle. An R-register initial condition pulse source 11 provides initializing signals via NAND-gate 34 to the R-shift register 32. The initial condition control pulse source 12 provides the initial condition control signal, as illustrated by waveform B of FIG. 4, to the NAND-gate 34 and via an inverter 29 to the adder-subtractor circuit 33 for reasons to be explained.

The adder-subtractor circuit 33 may comprise, for example, a conventional binary serial arithmetic circuit of a type well known in the binary computer art. The adder-subtractor circuit 33 adds the respective signals appearing at the inputs 37 and 38 thereby providing the sum thereof in bit serial fashion at the output terminal 39 when the add/sub control input 40 is in the binary ZERO state. The adder-subtractor circuit 33 subtracts the signal appearing at the input terminal 38 from the signal appearing at the input terminal 37 thereby providing the difference therebetween in bit serial fashion at the output terminal 39 when the add/sub control input 40 is in the binary ONE state.

The $C_R$-signal provided by the adder-subtractor circuit 33 is applied as an input to an overflow circuit 90. The Y'-signal and the $S_x'$-signal are also provided as inputs to the circuit 90. Control signals are provided to the circuit 90 by the clock pulse source 10, and a most significant bit time pulse source 14. The respective control signals are illustrated by waveforms A and D of FIG. 4.

The overflow circuit 90 provides, to other integrators of the computation system, a dz-output signal and an $S_z$-output signal on conductors 100 and 101, respectively.

The dz-signal is representative of the existence or absence of an overflow resulting from combining the Y-quantity with the R-quantity during the first word time or adding the trapezoidal correction quantity to the R-quantity during the second word time. The dz-signal is logically described by the Boolean expression $(Y' \cdot \overline{C}_R + \overline{Y}' \cdot C_R)$. The existence or absence of a dz-increment is represented by a binary ONE or a binary ZERO respectively on the dz-conductor 100.

The $S_z$-signal is representative of the sign of the dz-increment and is logically described by the Boolean expression $(Y' \cdot \overline{S}_x' + \overline{Y}' \cdot S_x')$. A positive or a negative dz-increment is represented by a binary ZERO or a binary ONE respectively on the $S_z$-conductor 101.

When a positive Y'-quantity is added to the R-quantity and the sum is greater than the capacity of the R-register, a positive overflow occurs. This condition is detected by examining the carry flip-flop of the adder-subtractor circuit 33 during the most significant bit time. If the carry flip-flop is in the ONE state, then a dz-output pulse is generated. The Boolean expression for the dz-signal as previously stated has the following significance. An overflow occurs when the carry flip-flop is in the ONE state during the most significant bit time and the Y'-quantity is positive or an overflow occurs when the carry flip-flop is in the ZERO state during the most significant bit time and the Y'-quantity is negative.

The polarity of the dz-signal is represented by the $S_z$-signal in accordance with the previously given Boolean expression which has the following significance. The $dz$-signal is positive, i.e., $S_z$ equals ZERO, when the Y'-quantity is positive and it is added to the R-quantity or the $dz$-signal is negative when the Y'-quantity is negative and it is subtracted from the R-quantity. The $dz$-signal is negative, i.e., $S_z$ equals ONE, when the Y'-quantity is negative and it is added to the R-quantity or the $dz$-signal is negative when the Y'-quantity is positive and it is subtracted from the R-quantity.

Referring still to the circuit 90, the Y'-signal and the $C_R$-signal are applied as inputs to a NAND-gate 91 and the inverses thereof are applied as inputs to a NAND-gate 92. The outputs of the NAND-gates 91 and 92 are combined via a wired AND configuration to provide the described $dz$-Boolean expression. The $dz$-Boolean signal is applied to a set input of a flip-flop 94 and the inverse thereof is applied by means of an inverter 93 to a clear input thereof. An additional set input and an additional clear input to the flip-flop 94 receive a control signal from the pulse source 14 during the most significant bit time with respect to the R-binary number. By this means the $dz$-signal, representative of an overflow, is stored in the flip-flop 94 during the most significant bit time of the first and second word times of the computation cycle. The Q-output of the flip-flop 94 provides the $dz$-signal on conductor 100 during the next following word time.

In a similar manner, the $S_z$-Boolean expression is implemented by inverters 95 and 98 and NAND-gates 96 and 97 and is stored in a flip-flop 99.

In operation, the integrator, as illustrated in FIG. 1, of a DDA computation system is conditioned to perform a computation by setting the Y-quantity and the R-quantity to proper initial values. During the initialization of the system, the initial condition control pulse source 12 provides a signal that enables the NAND-gate 34 associated with R-register 32 and enables the NAND-gate 75 associated with the Y-register 72. The signal from the pulse source 12, in addition, disables the NAND-gates 35 and 36 of the adder-subtractor circuit 33 via the inverter 29 and also disables the corresponding NAND gates of the incrementing-decrementing circuit 73 via the inverter 76. The R-initial condition signal is suitably provided by an R-register initial condition pulse source 11 through the enabled NAND-gate 34 to the R-storage register comprising the flip-flop 31 and the shift register 32. The Y-initial condition signal is suitably provided by a Y-register initial condition pulse source 19 through the enabled NAND-gate 75 to the Y-storage register comprising the flip-flop 71 and the shift register 72. After the initialization procedure is completed, the integrator is conditioned for computation by the initial condition pulse source 12 whose output signal then disables the NAND-gates 34 and 75 and enables the NAND-gates 35 and 36 of the adder-subtractor circuit 33 as well as the corresponding NAND gates of the incrementing-decrementing circuit 73.

During the first and second word times of a computation cycle, the Y-quantity stored in the Y-shift register 72 is incremented or decremented in accordance with the $dy$- and $S_y$ signals by means of the circuit 73. A binary ZERO on the $S_y$-conductor 23 renders the circuit 73 additive and a binary ONE on the $S_y$-conductor 23 renders the circuit 73 subtractive.

The Y-binary number is serially shifted into the incrementing-decrementing circuit 73 in the order of increasing bit significance. Because of the inclusion of the flip-flop 71 as part of the Y-storage register, the order of the least significant bit position of the Y-number has a numerical significance of one-half. The flip-flop 71 is included for reasons related to the R-quantity, which reasons will become clear hereinafter.

The order of the second least significant bit of the Y-binary number has a numerical significance of unity. The incrementing-decrementing circuit 73 adds or subtracts unity from the Y-quantity when a $dy$-increment exists. A second least significant bit time pulse source 18 enables the NAND-gate 74 during the second least significant bit time thereby permitting the $dy$-signal on the conductor 22 to pass therethrough providing a signal of unit significance for the arithmetic operation. It will be appreciated that increments other than unity may be added to the Y-quantity. By altering the bit timing of the pulse source 18 with respect to the Y-quantity, increments of a selected integral power of two may be combined with the Y-quantity in a well-known manner.

The $\overline{Y}_{w}$-signal, which represents the incremented or decremented Y-quantity, is shifted back into the Y-storage register comprising the flip-flop 71 and the Y-shift register 72. The incrementation or decrementation of the Y-quantity is performed during both the first and second word times of each computation cycle. The $Y_w$-signal is provided to the rectangular integration and trapezoidal correction circuit 50 via the inverter 70 as previously explained.

During the first word time of the computation cycle, the first word time pulse source 17 provides an enabling signal to the NAND-gate 56 of the rectangular integration and trapezoidal correction circuit 50. The $dx$-conductor 20 also provides an enabling signal to the NAND-gate 56 when a $dx$-increment exists. Therefore, during the first word time, when a $dx$-increment exists, the $Y_w$-signal passes through the NAND-gate 56 to provide the Y'-signal via the inverter 58 to the adder-subtractor circuit 33.

The signal provided by the first word time pulse source 17 also enables the NAND-gate 59 during the first word time of the computation cycle. Therefore, during the first word time, the $S_x$-signal on conductor 21 passes therethrough to provide the $S_x'$-signal via the inverter 60 to the adder-subtractor circuit 33.

During the first word time, the adder-subtractor circuit 33 is rendered additive or subtractive in accordance with the $S_x'$-signal being in the binary ZERO state or in the binary ONE state, respectively. The $R_R$-signal from the R-shift register 32, is applied in bit serial fashion in the order of increasing bit significance to the adder-subtractor circuit 33.

The adder-subtractor circuit 33 combines the Y'-signal with the $R_R$-signal in the conventional manner of a binary serial arithmetic circuit thereby providing the $R_w$-signal. The $R_w$-signal is then shifted back into the R-storage register comprising the flip-flop 31 and the R-shift register 32.

During the most significant bit time of the first word time of the computation cycle the overflow circuit 90 examines the state of the carry flip-flop of the adder-subtractor circuit 33, the state of the $S_x'$-signal and the polarity of the Y'-signal thereby determining the existence and polarity of any overflow that may have occurred during the first word time of the computation cycle in the manner previously described and stores the overflow signal in the flip-flop 94 and the polarity thereof in the flip-flop 99 thereby providing the $dz$- and $S_z$-signals on the conductors 100 and 101 respectively.

During the second word time of the computation cycle, the rectangular integration and trapezoidal correction circuit 50 provides a trapezoidal correction quantity which is combined with the R-quantity by the adder-subtractor circuit 33. During the second word time, the second word time pulse source 16 provides an enabling signal to the NAND-gate 55. The $dx$-signal, the $dy$-signal and the signal from the least significant bit time pulse source 15 also provide enabling inputs thereto. The NAND-gate 55 is enabled only when all four of the inputs thereto provide binary ONE signals. The output of the NAND-gate 55 provides the trapezoidal correction quantity via the inverter 58. A trapezoidal correction quantity therefore is provided only during the second word time when the least significant bit time pulse source 15 provides an enabling signal and the $dx$-increment and the $dy$-increment simultaneously exist. The $dx$-increment and the $dy$-increment each has a numerical significance of unity with respect to the R-quantity. The trapezoidal correction quantity has a numerical significance of $\frac{1}{2} \cdot dx \cdot dy$, which quantity is combined with the R-quantity by the adder-subtractor circuit 33.

The R-quantity, represented by the $R_R$-signal, is provided to the adder-subtractor circuit 33 by the R-storage register which comprises the flip-flop 31 and the R-shift register 32. Because the flip-flop 31 is connected in series circuit with the R-shift register, the least significant bit of the R-quantity has a numerical significance of one-half. During the second word time of the computation cycle, the R-quantity is shifted into the adder-subtractor circuit 33 in bit serial fashion in the order of increasing bit significance at the same time as the trapezoidal correction quantity signal from the NAND-gate 55 is applied thereto. Since the trapezoidal correction quantity is provided during the least significant bit time, a numerical quantity of one-half is combined with the R-quantity when the $dx$- and the $dy$-increments simultaneously exist.

During the second word time of the computation cycle, the $S_x'$-signal, provided by the circuit 50, is representative of the sign of the trapezoidal correction quantity as previously explained. The adder-subtractor circuit 33 is rendered additive or subtractive during the second word time in accordance with the $S_x'$-signal being in the binary ZERO state or the binary ONE state, respectively.

The trapezoidally corrected R-quantity, represented by the $\bar{R}_W$-signal, is shifted back into the R-storage register as previously explained with respect to the operation of the R-storage register during the first word time.

As previously described with respect to the first word time, overflows occurring as a result of combining the trapezoidal correction quantity with the R-quantity are detected by the overflow circuit 90 thereby providing the $dz$- and $S_z$-signals as previously described.

Referring now to FIG. 2, in which like reference numerals indicate like components with respect to FIG. 1, an embodiment of an integrator in accordance with the present invention is illustrated wherein successively occurring trapezoidal correction quantities are stored and combined before being added to the R-register 32.

The Y-shift register 72, as previously explained, is included in the integrator for storing the Y-quantity which comprises, for example, a binary number. The clock pulse source 10 connected to the shift register 72 provides the shifting pulses, as illustrated by waveform A of FIG. 4, for shifting the Y-binary number therethrough.

The output signal, $Y_R$, of the Y-shift register 72 is connected as an input to the incrementing-decrementing circuit 73 to which the Y-quantity, $Y_R$, is applied in bit serial fashion in response to the shifting pulses provided by the clock pulse source 10. The bits of the Y-quantity are shifted into the incrementing-decrementing circuit 73 in the order of increasing significance. Additionally, the $dy$-signal and the $S_y$-signal, from other integrators of the system, are applied respectively via the conductors 22 and 23 as inputs to the incrementing-decrementing circuit 73. The $dy$-signal is applied to the circuit 73 via the NAND-gate 74 for the reasons previously discussed. The existence or absence of a $dy$-increment during a computation cycle is determined, as previously explained, by the binary state of the $dy$-signal present on the conductor 22 during the computation cycle. A binary ONE or a binary ZERO signal on the conductor 22 is determinant of the existence or absence thereof respectively. The $S_y$-signal is representative of the sign of the $dy$-increment which sign is positive or negative in accordance with the $S_y$-signal being in the binary ZERO state or the binary ONE state respectively. The least significant bit time pulse source 15 provides the control signal, as illustrated by waveform G of FIG. 4, to the NAND-gate 74 to which the $dy$-input signal is also applied. The least significant bit time pulse source 15 controls the numerical significance of the $dy$-increment or decrement combined with the Y-quantity by the circuit 73 in the manner described with respect to FIG. 1. The clock pulse source 10, connected generally to the incrementing-decrementing circuit 73 provides control signals thereto, as illustrated by waveform A of FIG. 4.

The incrementing-decrementing circuit 73 combines the $dy$-increment with the Y-quantity, $Y_R$, during a computation cycle, in accordance with the $dy$- and $S_y$-signals. When the $S_y$-signal is representative of the positive sign during the computation cycle, the $dy$-increment is added to the Y-quantity and when the $dy$-signal is representative of the negative sign during the computation cycle, the $dy$-increment is subtracted therefrom. When the $dy$-signal is representative of the absence of a $dy$-increment, the Y-quantity remains unaltered. The addition or subtraction of the $dy$-increment with respect to the Y-quantity is performed in bit serial fashion in the conventional manner previously explained with respect to FIG. 1. The Y-register initial condition pulse source 19 provides initializing signals via a NAND-gate 75 to the Y-shift register 72. The initial condition control pulse source 12 provides an initial condition control signal, as illustrated by waveform B of FIG. 4 to the NAND-gate 75 and via an inverter 76 to the incrementing-decrementing circuit 73 for the reasons with respect to FIG. 1.

The incrementing-decrementing circuit 73 provides the $\bar{Y}_W$-signal representative of the combined Y-quantity and $dy$-increment. The $\bar{Y}_W$-signal is applied via the inverter 70, in bit serial fashion, to the input of the Y-shift register 72.

The incrementing-decrementing circuit 73 comprises, for example, a conventional serial arithmetic circuit of the type previously described with respect to FIG. 1.

The $Y_W$-signal provided by the incrementing-decrementing circuit 73 via the inverter 70 is applied as an input to the rectangular integration and correction storage circuit 107. The rectangular integration and correction storage circuit 107, together with the adder-subtractor circuit 33 perform rectangular integration with respect to the Y- and R-quantities during the first word time of the computation cycle and add a correction quantity to the R-quantity during the second word time thereof. The $dx$-signal and the $S_x$-signal are applied via the conductors 20 and 21 as inputs to the rectangular integration and correction storage circuit 107. The $dx$- and the $S_x$-signals are provided either from the system timing signal source, as indicated by the legend, or from other integrators of the system depending on the function performed by the integrator in the computation. The existence or absence of a $dx$-increment, during a computation cycle, is determined by the binary state of the $dx$-signal present on the conductor 20 during the computation cycle. A binary ONE or a binary ZERO signal on the conductor 20 is determinant of the existence or absence thereof respectively. The $S_x$-signal is representative of the sign of the $dx$-increment which sign is positive or negative in accordance with the $S_x$-signal being in the binary ZERO state or binary ONE state, respectively. The first word time pulse source 17 provides the control signal, as illustrated by waveform K of FIG. 4, to the rectangular integration and correction storage circuit 107.

During the first word time of the computation cycle, the rectangular integration and correction storage circuit 107 provides the Y'-signal, as indicated by the legend, representative of the rectangular integration function $Y_W dx$. The circuit 107 includes a NAND-gate 114 which is responsive to the first word time pulse source 17, the $Y_W$-signal and the $dx$-signal and provides the Y'-signal during the first word time via an inverter 120 in a manner to be explained.

The rectangular integration and correction storage circuit 107 also provides the $S_x'$-signal which, during the first word time, is representative of the $S_x$-signal. The $S_x'$-signal provides a control function for the adder-subtractor circuit 33 during the first word time. When the $S_x'$-signal is in the binary ZERO state, the adder-subtractor circuit 33 algebraically adds the Y-quantity to the R-quantity. When the $S_x'$-signal is in the binary ONE state, the circuit 33 algebraically subtracts the Y-quantity from the R-quantity. A NAND-gate 112 responsive to the first word time pulse source 17 and the $S_x$-signal, provides the $S_x'$-signal during the first word time via an inverter 115 in a manner to be explained.

The $dy$-signal and the $S_y$-signal are applied respectively via the conductors 22 and 23 as inputs to the rectangular integration and correction storage circuit 107. The second word time pulse source 16 and the least significant bit time pulse source 15 provide control signals, as illustrated respectively by waveforms H and G of FIG. 4, to the circuit 107. The Y'-signal provided during the second word time of the computation cycle by the rectangular integration and correction storage circuit 107 is representative of the algebraic accumulation of successively occurring pairs of trapezoidal correction quantities and is derived in a manner to be explained. The $S_x'$-signal provided during the second word time by the circuit 107 is representative of the sign of the accumulated trapezoidal correction. The accumulated correction quantity is positive when the $S_x'$-signal is in the binary ZERO state or is negative when the $S_x'$-signal is in the binary ONE state. The $S_x'$-signal is provided by the rectangular integration and correction storage circuit 107 in a manner to be explained.

Referring still to the circuit 107, a NAND-gate 113, responsive to the second word time pulse source 16, the $dy$-signal and the $dx$-signal, provides a signal to the trigger input of a flip-flop 117 via an inverter 116. The signal provided by the inverter 116, which signal is also applied as enabling inputs to NAND-gates 118 and 119, is representative of the simultaneous existence of the $dx$-increment and the $dy$-increment during the second word time of a computation cycle. The signal provided by the inverter 116, therefore, is representative of the trapezoidal correction quantity which has a numerical significance of one-half.

The Q-output and the $\bar{Q}$-output of the flip-flop 117 are connected to a C-input and to an S-input thereof, respectively. The flip-flop 117, therefore, toggles in response to pulse signals appearing on the T-input thereof. The flip-flop 117 may be selected to be of the type responsive to the trailing edges of pulses applied to the T-input thereof. The Q-output and the $\bar{Q}$-output of the flip-flop 117 are connected as enabling inputs to the NAND-gates 118 and 119 respectively. The least significant bit time pulse source 15 also provides enabling signals to the NAND-gates 118 and 119. The NAND-gates 118 and 119, in addition, are responsive to the $S_x'$-signal and the $\bar{S}_x'$-signal respectively. The circuit comprising the NAND-gates 113, 118 and 119, the inverter 116 and the flip-flop 117 provides the Y'-signal, via the inverter 120, during the second word time, in a manner to be explained.

The $S_x'$-signal provided during the second word time, as previously explained, represents the sign of the accumulated correction quantity and is provided via the inverter 115 by means of inverters 108 and 109 and NAND-gates 110 and 111. The $S_x'$-signal, during the second word time, is representative of the Boolean expression $(S_x \cdot \bar{S}_y + \bar{S}_x \cdot S_y)$. This Boolean expression is logically descriptive of the conditions wherein the $S_x'$-signal is in the binary ZERO state, which represents the positive sign, whenever the $S_x$-signal and the $S_y$-signal represent the same sign with respect to each other; or the $S_x'$-signal is in the binary ONE state, which represents the negative sign, whenever the $S_x$-signal and the $S_y$-signal represent different signs with respect to each other.

The NAND-gate 110 is responsive to the second word time pulse source 16, the $S_x$-signal via the inverter 108 and the $S_y$-signal. Similarly, the NAND-gate 111 is responsive to the second word time pulse source 16, the $S_y$-signal via the inverter 109 and the $S_x$-signal. The output signals of the NAND-gates 110 and 111 are applied as the input to the inverter 115 via a wired AND configuration. The output signal of the inverter 115 provides the $S_x'$-signal during the second word time of the computation cycle. The $S_x'$-signal during the second word time is representative of the above given Boolean function.

The R-shift register 32, as previously explained, is included in the integrator of the present invention for storing the R-quantity which comprises, for example, a binary number. The clock pulse source 10, connected to the shift register 32, provides the shifting pulses as illustrated by waveform A of FIG. 4, for shifting the R-binary number therethrough.

The output, $R_R$, of the R-shift register 32 is connected as an input to the adder-subtractor circuit 33 to which the R-quantity, $R_R$, is applied in bit serial fashion in response to the shifting pulses provided by the clock pulse source 10. The bits of the R-quantity are shifted into the adder-subtractor circuit 33 in the order of increasing significance. The rectangular integration and correction storage circuit 107 provides the Y'-signal and the $S_x'$-signal as inputs to the adder-subtractor circuit 33, as previously explained. The Y'-signal comprises, for example, a binary number and is provided to the adder-subtractor circuit 33 in bit serial fashion in the order of increasing bit significance.

During the first word time of the computation cycle, the adder-subtractor circuit 33 combines the Y'-signal with the R-signal in serial arithmetic fashion. The $S_x'$-signal determines whether the Y'-signal is added to the R-signal or subtracted therefrom in the manner previously explained with respect to FIG. 1.

During the second word time of the computation cycle, the adder-subtractor circuit 33 combines the Y'-signal, which during the second word time represents an accumulated correction quantity, with the R-quantity in serial arithmetic fashion. The correction quantity is combined with the R-quantity, in a manner to be explained, in accordance with the $S_x'$-signal, which during the second word time is representative of the sign of the correction quantity.

The adder-subtractor circuit 33 provides the $\bar{R}_W$-signal representative of the combined Y'-signal and R-signal. The $\bar{R}_W$-signal is applied via an inverter 30, in bit serial fashion to the input of the R-shift register 32. The adder-subtractor circuit 33 also provides the signal, $C_R$, representative of the carry produced either during the first word time or the second word time of the computation cycle.

The R-register initial condition pulse source 11 provides initializing signals via a NAND-gate 34 to the R-shift register 32. The initial condition control pulse source 12 provides the initial condition control signal, as illustrated by waveform B of FIG. 4 to the NAND-gate 34 and via an inverter 29 to the adder-subtractor circuit 33 for the reasons previously explained with respect to FIG. 1.

The adder-subtractor circuit 33 comprises, for example, a conventional serial arithmetic circuit of the type previously described with respect to FIG. 1.

The $C_R$-signal, provided by the adder-subtractor circuit 33, is applied as an input to the overflow circuit 90. The Y'-signal and the $S_x'$-signal are also provided as inputs to the circuit 90. Control signals are provided to the circuit 90 by the clock pulse source 10 and the most significant bit time source 14. The respective control signals are illustrated by waveforms A and D of FIG. 4.

The overflow circuit 90 provides, to other integrators of the computation system, the $dz$-output signal and the $S_z$-output signal on the conductors 100 and 101, respectively, as previously explained with respect to FIG. 1.

In operation, the integrator as illustrated in FIG. 2, of a DDA computation system, is conditioned to perform a computation by setting the Y-quantity and the R-quantity to proper initial values in the manner described with respect to FIG. 1. After the initialization procedure is completed, the integrator is conditioned for computation by the initial condition control source 12 as previously explained.

During the first and second word times of a computation cycle, the Y-quantity stored in the Y-shift register 72 is incremented or decremented in accordance with the $dy$- and $S_y$-signals by means of the circuit 73. A binary ZERO on the $S_y$-conductor 23 renders the circuit 73 additive and a binary ONE on the $S_y$-conductor 23 renders the circuit 73 subtractive in the manner previously explained with respect to FIG. 1.

The Y-binary number is serially shifted into the incrementing-decrementing circuit 73 in the order of increasing bit significance. The order of the least significant bit of the Y-binary number has a numerical significance of unity. The incrementing-decrementing circuit 73 adds or subtracts unity from the Y-quantity when a $dy$-increment exists. The pulse source 15 enables the NAND-gate 74 during the least significant bit time thereby permitting the $dy$-signal on conductor 22 to pass therethrough providing a signal of unit significance for the arithmetic operation in a manner similar to that previously described with respect to FIG. 1. The $Y_W$-signal, which represents the incremented or decremented Y-quantity, is shifted back into the Y-shift register 72. The incrementation or decrementation of the Y-quantity is performed during both the first and second word times of each computation cycle. The $Y_W$-signal is provided to the rectangular integration and correction storage circuit 107 via the inverter 70 as previously explained.

During the first word time of the computation cycle, the first word time pulse source 17 provides an enabling signal to the NAND-gate 114 of the rectangular integration and correction storage circuit 107. The $dx$-conductor 20 also provides an enabling signal to the NAND-gate 114 when a $dx$-increment exists. Therefore, during the first word time when a $dx$-increment exists, the $Y_W$-signal passes through the NAND-gate 114 to provide the $Y'$-signal, via the inverter 120, to the adder-subtractor circuit 33.

The signal provided by the first word time pulse source 17 also enables the NAND-gate 112 during the first word time of the computation cycle. Therefore, during the first word time, the $S_x$-signal on conductor 21 passes therethrough to provide the $S_x'$-signal via the inverter 115 to the adder-subtractor circuit 33.

During the first word time, the adder-subtractor circuit 33 is rendered additive or subtractive in accordance with the $S_x'$-signal being in the binary ZERO state or in the binary ONE state respectively. The $R_R$-signal, from the R-shift register 32 is applied in bit serial fashion, in the order of increasing bit significance, to the adder-subtractor circuit 33. The circuit 33 combines the $Y'$-signal with the $R_R$-signal providing the $R_W$-signal via the inverter 30 in the manner previously explained with respect to FIG. 1. The $R_W$-signal is then shifted back into the R-shift register 32.

The overflow circuit 90 detects any overflows that may have occurred during the first word time and provides the $dz$-signal and the $S_z$-signal in the manner previously described with respect to FIG. 1.

During the second word time of the computation cycle, the rectangular integration and correction storage circuit 107 provides an accumulated correction quantity which is combined with the R-quantity by the adder-subtractor circuit 33. During the second word time, the second word time pulse source 16 provides an enabling signal to the NAND-gate 113. The $dx$-signal and the $dy$-signal also provide enabling inputs thereto. The NAND-gate 113 is enabled only when all three of the inputs thereto provide binary ONE signals. Thus, the NAND-gate 113 provides an output signal representative of the existence of a trapezoidal correction quantity during the second word time whenever the $dx$-increment and the $dy$-increment simultaneously exist. The trapezoidal correction quantity has a numerical significance of one-half with respect to the R-quantity. The flip-flop 117 is toggled in response to successively occurring trapezoidal correction quantities as previously explained. The trapezoidal correction quantity signal also provides enabling inputs to the NAND-gates 118 and 119 via the inverter 116. The $S_x'$-signal provides an enabling input to the NAND-gate 118 whenever the trapezoidal correction quantity is negative and the $\overline{S_x}'$-signal provides an enabling input to the NAND-gate 119 whenever the trapezoidal correction quantity is positive.

If, for example, two successive negative trapezoidal correction quantities should occur, the first occurring quantity would toggle the flip-flop 117 to the Q-state thereby enabling NAND-gate 118. This first occurring trapezoidal correction quantity is, in effect, stored in the flip-flop 117. When the second negative trapezoidal correction quantity occurs, it passes through the previously enabled gate 118, thereby providing an accumulated correction quantity signal via the inverter 120. This second trapezoidal quantity then resets flip-flop 117 to the $\overline{Q}$-state. The least significant bit time pulse source 18, permits the NAND-gate 118 to be enabled only during the least significant bit time of the second word time. The accumulated correction quantity signal therefore has a numerical significance of unity with respect to the R-quantity for reasons to be discussed later.

Should, however, the second occurring trapezoidal correction quantity, of the cited example, have a positive sign, the NAND-gate 118 will be disabled by the $S_x'$-signal, thus not providing an accumulated correction quantity for the two successively occurring trapezoidal correction quantities having opposite signs with respect to each other. The accumulated correction quantity provided via the inverter 120 during the least significant bit time of the second word time is combined with the R-quantity by the adder-subtractor circuit 33.

The R-quantity, represented by the $R_R$-signal, is provided to the adder-subtractor circuit 33 by the R-shift register 32. The least significant bit of the R-quantity has a numerical significance of unity. During the second word time of the computation cycle, the R-quantity is shifted into the adder-subtractor circuit 33 in bit serial fashion in the order of increasing bit significance at the same time as the accumulated correction quantity signal from the inverter 120 is applied thereto. Since the accumulated correction quantity signal is provided during the least significant bit time of the R-quantity signal, a numerical value of unity is combined with the R-quantity when two successively occurring trapezoidal correction quantities of like sign have been accumulated by the correction storage flip-flop 117.

During the second word time of the computation cycle, the $S_x'$-signal provided by circuit 107, is representative of the sign of the accumulated correction quantity as previously explained. The adder-subtractor circuit 33 is rendered additive or subtractive during the second word time in accordance with the $S_x'$-signal being in the binary ZERO state or the binary ONE state respectively in the manner previously described with respect to FIG. 1.

The corrected R-quantity, represented by the $R_W$-signal, is then shifted back into the R-shift register 32.

The overflow circuit 90, which is responsive to the $C_R$-signal, the $Y'$-signal and the $S_x'$-signal, provides the $dz$-output signal and the $S_z$-output signal on the conductors 100 and 101, respectively, in the manner previously explained with respect to FIG. 1.

Referring now to FIG. 3 in which like reference numerals indicate like components with respect to FIGS. 1 and 2, an embodiment of an integrator in accordance with the present invention is illustrated wherein multiple inputs are combined to provide the integrand in accordance with the equation $dz = Y_1 dx_1 + Y_2 dx_2$.

A $Y_1$-shift register 310 is included in the integrator for storing the $Y_1$-quantity which comprises, for example, a binary number. The clock pulse source 10 connected to the shift register 310 provides the shifting pulses, as illustrated by waveform A of FIG. 4, for shifting the $Y_1$-binary number therethrough.

The output signal, $Y_{R1}$, of the $Y_1$-shift register 310 is connected as an input to an incrementing-decrementing circuit 311 to which the $Y_1$-quantity, $Y_{R1}$, is applied in bit serial fashion in response to the shifting pulses provided by the clock pulse source 10. The bits of the $Y_1$-quantity are shifted into the incrementing-decrementing circuit 311 in the order of increasing significance. Additionally, the $dy_1$-signal and the $S_{y1}$-signal, from other integrators of the system, are applied respectively via the conductors 312 and 313 as inputs to the incrementing-decrementing circuit 311. The $dy_1$-signal is applied to the circuit 311 via the NAND-gate 314 for the reasons previously discussed with respect to FIGS. 1 and 2. The existence or absence of a $dy_1$-increment during a computation cycle is determined by the binary state of the $dy_1$-signal present on the conductor 312 during the computation cycle. A binary ONE or a binary ZERO signal on the conductor 312 is determinant of the existence or absence thereof respectively. The $S_{y1}$-signal is representative of the sign of the $dy_1$-increment which sign is positive or negative in accordance with the $S_{y1}$-signal being in the binary ZERO state or the binary ONE state respectively. The least significant bit time pulse source 15 provides the control signal, as illustrated by waveform G of FIG. 4, to the NAND-gate 314 to which the $dy_1$-input signal is also applied. The least significant bit time pulse source 15 controls the numerical significance of the $dy_1$-increment or decrement combined with the $Y_1$-quantity by the circuit 311 in the manner described with respect to FIGS. 1 and 2. The clock pulse source 10, connected to the incrementing-decrementing circuit 311 provides control signals thereto, as illustrated by waveform A of FIG. 4.

The incrementing-decrementing circuit 311 combines the $dy_1$-increment with the $Y_1$-quantity, $Y_{R1}$, during a computation cycle, in accordance with the $dy_1$- and $S_{y1}$-signals. When the $S_{y1}$-signal is representative of the positive sign during the computation cycle, the $dy_1$-increment is added to the $Y_1$-quantity and when the $dy_1$-signal is representative of the negative sign during the computation cycle, the $dy_1$-increment is subtracted therefrom. When the $dy_1$-signal is representative of the absence of a $dy_1$-increment, the $Y_1$-quantity remains unaltered. The addition or subtraction of the $dy_1$-increment with respect to the $Y_1$-quantity is performed in bit serial fashion in the conventional manner previously explained with respect to FIGS. 1 and 2.

It will be appreciated that although the apparatus for providing initial condition signals to the registers of the system, which apparatus is illustrated in FIGS. 1 and 2, is not shown in FIG. 3, similar means may be included to provide this function.

The incrementing-decrementing circuit 311 provides the $\overline{Y}_{W1}$-signal representative of the combined $Y_1$-quantity and $dy_1$-increment. The $\overline{Y}_{W1}$-signal is applied via an inverter 315, in bit serial fashion, to the input of the $Y_1$-shift register 310.

The incrementing-decrementing circuit 311 comprises, for example, a conventional serial arithmetic circuit of the type previously described with respect to FIGS. 1 and 2.

A $Y_2$-shift register 317 is included in the integrator for storing the $Y_2$-quantity which comprises, for example, a binary number. The clock pulse source 10 connected to the shift register 317 provides the shifting pulses, as illustrated by waveform A of FIG. 4, for shifting the $Y_2$-binary number therethrough.

The output signal, $Y_{R2}$, of the $Y_2$-shift register 317 is connected as an input to an incrementing-decrementing circuit 320 to which the $Y_2$-quantity, $Y_{R2}$, is applied in bit serial fashion in response to the shifting pulses provided by the clock pulse source 10. The bits of the $Y_2$-quantity are shifted into the incrementing-decrementing circuit 320 in the order of increasing significance. Additionally, a $dy_2$-signal and an $S_{y2}$-signal, from other integrators of the system, are applied respectively via the conductors 121 and 122 as inputs to the incrementing-decrementing circuit 320. The $dy_2$-signal is applied to the circuit 320 via the NAND-gate 123 for the reasons previously discussed with respect to FIGS. 1 and 2. The existence or absence of a $dy_2$-increment during a computation cycle is determined by the binary state of the $dy_2$-signal present on the conductor 121 during the computation cycle. A binary ONE or a binary ZERO signal on the conductor 121 is determinant of the existence or absence thereof respectively. The $S_{y2}$-signal is representative of the sign of the $dy_2$-increment which sign is positive or negative in accordance with the $S_{y2}$-signal being in the binary ZERO state or the binary ONE state respectively.

The least significant bit time pulse source 15 provides the control signal, as illustrated by waveform G of FIG. 4, to the NAND-gate 123 to which the $dy_2$-input signal is also applied. The least significant bit time pulse source 15 controls the numerical significance of the $dy_2$-increment or decrement combined with the $Y_2$-quantity by the circuit 320 in the manner described with respect to FIGS. 1 and 2. The clock pulse source 10, connected to the incrementing-decrementing circuit 320 provides control signals thereto, as illustrated by waveform A of FIG. 4.

The incrementing-decrementing circuit 320 combines the $dy_2$-increment with the $Y_2$-quantity, $Y_{R2}$, during a computation cycle, in accordance with the $dy_2$- and $S_{y2}$-signals. When the $S_{y2}$-signal is representative of the positive sign during the computation cycle, the $dy_2$-increment is added to the $Y_2$-quantity and when the $dy_2$-signal is representative of the negative sign during the computation cycle, the $dy_2$-increment is subtracted therefrom. When the $dy_2$-signal is representative of the absence of a $dy_2$-increment, the $Y_2$-quantity remains unaltered. The addition or subtraction of the $dy_2$-increment with respect to the $Y_2$-quantity is performed in bit serial fashion in the conventional manner previously described with respect to FIGS. 1 and 2.

The incrementing-decrementing circuit 320 provides the $\overline{Y}_{W2}$-signal representative of the combined $Y_2$-quantity and $dy_2$-increment. The $\overline{Y}_{W2}$-signal is applied via an inverter 124, in bit serial fashion, to the input of the $Y_2$-shift register 117.

The incrementing-decrementing circuit 320 comprises, for example, a conventional serial arithmetic circuit of the type previously described with respect to FIGS. 1 and 2.

The $Y_{w2}$ signal provided by the incrementing-decrementing circuit 320 via the inverter 124 as well as the $Y_{w1}$-signal provided by the incrementing-decrementing circuit 311 via the inverter 315 are applied as inputs to a multi-input rectangular integration and trapezoidal correction circuit 316. The multi-input rectangular integration and trapezoidal correction circuit 316, together with adder-subtractor circuits 318 and 319 perform combined rectangular integration with respect to the $Y_1$-, $Y_2$- and R- quantities during the first word time of the computation cycle in a manner to be described and add a correction quantity to the R-quantity during the second word time thereof.

A $dx_1$-signal and an $S_{x1}$-signal are applied respectively via the conductors 143 and 144 as inputs to the multi-input rectangular integration and trapezoidal correction circuit 316. The $dx_1$- and the $S_{x1}$-signals are provided either from the system timing signal source, as indicated by the legend, or from other integrators of the system depending on the function performed by the integrator in the computation. The existence or absence of a $dx_1$-increment, during a computation cycle, is determined by the binary state of the $dx_1$-signal present on the conductor 143 during the computation cycle. A binary ONE or a binary ZERO signal on the conductor 143 is determinant of the existence or absence thereof respectively. The $S_{x1}$-signal is representative of the sign of the $dx_1$-increment which sign is positive or negative in accordance with the $S_{x1}$-signal being in the binary ZERO state or binary ONE state, respectively.

In a similar manner, a $dx_2$-signal and an $S_{x2}$-signal are applied respectively via the conductors 147 and 125 as inputs to the multi-input rectangular integration and trapezoidal circuit 316. The $dx_2$- and $S_{x2}$-signals are provided either from the system timing signal source or from other integrators of the system depending on the function performed by the integrator in the computation. The existence or absence of a $dx_2$-increment, during a computation cycle, is determined by the binary state of the $dx_2$-signal present on the conductor 147 during the computation cycle. A binary ONE or a binary ZERO signal on the conductor 147 is determinant of the existence or absence thereof respectively. The $S_{x2}$-signal is representative of the sign of the $dx_2$-increment which sign is positive or negative in accordance with the $S_{x2}$-signal being in the binary ZERO state or binary ONE state, respectively.

During the first word time of the computation cycle, the multi-input rectangular integration and trapezoidal correction circuit 316 provides the $Y_1'$-signal, as indicated by the legend, representative of the rectangular integration function $Y_{W1} \cdot dx_1$. The circuit 316 includes a NAND-gate 126 which is responsive to the first word time pulse source 17, the $Y_{W1}$-signal and the $dx_1$-signal and provides the $Y_1'$-signal during the first word time via an inverter 127, in a manner to be explained. The multi-input rectangular integration and trapezoidal correction circuit 316 also provides the $S_{x1}'$-signal during the first word time, which signal is representative of the $S_{x1}$-signal. The $S_{x1}'$-signal provides a control function for the adder-subtractor circuit 318 during the first word time. When the $S_{xI}'$-signal is in the binary ZERO state, the adder-subtractor circuit 318 algebraically adds the $Y_1$-quantity to the output signal provided by the adder-subtractor circuit 319. When the $S_{xI}'$-signal is in the binary ONE state, the circuit 318 algebraically subtracts the $Y_1$-quantity from the output signal of the adder-subtractor circuit 319. A NAND-gate 128 responsive to the first word time pulse source 17 and the $S_{xI}$-signal, provides the $S_{xI}'$-signal during the first word time via an inverter 129, in a manner to be explained.

In a similar manner, during the first word time, the multi-input rectangular integration and trapezoidal correction circuit 116 provides the $Y_2'$-signal as indicated by the legend, representative of the rectangular integration function $Y_{u2} \cdot dx_2$. The circuit 116 includes a NAND-gate 130 which is responsive to the first word time pulse source 17, the $Y_{u2}$-signal and the $dx_2$-signal and provides the $Y_2'$-signal during the first word time via an inverter 131, in a manner to be explained.

The multi-input rectangular integration and trapezoidal correction circuit 116 also provides the $S_{x2}'$-signal during the first word time, which signal is representative of the $S_{x2}$-signal. The $S_{x2}'$-signal provides a control function for the adder-subtractor circuit 319 during the first word time. When the $S_{x2}'$-signal is in the binary ZERO state, the adder-subtractor circuit 319 algebraically adds the $Y_2$-quantity to the R-quantity. When the $S_{x2}'$-signal is in the binary ONE state, the circuit 319 algebraically subtracts the $Y_2$-quantity from the R-quantity. The $S_{x2}'$-signal is provided directly from the $S_{x2}$-signal which in turn is provided to the multi-input rectangular integration and trapezoidal correction circuit 316 via the conductor 125.

The $dy_1$-signal and the $S_{y1}$-signal are applied respectively via the conductors 312 and 313 as inputs to the multi-input rectangular integration and trapezoidal correction circuit 316 and the $dy_2$-signal and the $S_{y2}$-signal are applied respectively thereto via the conductors 121 and 122. The second word time pulse source 16, the most significant bit time pulse source 14 and the least significant bit time pulse source 15 provide control signals, as illustrated respectively by waveforms H, D and G of FIG. 4, to the circuit 116. The $Y'_1$-signal provided during the second word time of the computation cycle by the multi-input rectangular integration and trapezoidal correction circuit 316 is representative of the algebraic sum of simultaneously occurring or successively occurring pairs of trapezoidal correction quantities and is derived in a manner to be explained. The $S_{xI}'$-signal provided during the second word time by the circuit 316 is representative of the sign of the summed or accumulated trapezoidal correction quantity. The summed or accumulated correction quantity is positive when the $S'_{xI}$-signal is in the binary ZERO state or is negative when the $S'_{xI}$-signal is in the binary ONE state. The $S'_{xI}$-signal is provided by the multi-input rectangular integration and trapezoidal correction circuit 116 in a manner to be explained. The $Y'_2$-output and the $S'_{x2}$-output of the circuit 316 are not utilized during the second word time of the computation cycle.

Referring still to the circuit 316, the $dx_1$-signal and the $dy_1$-signal provide inputs to a NAND-gate 148 which in turn provides an input to a NAND-gate 131 via an inverter 132. Similarly, the $dx_2$-signal and the $dy_2$-signal provide inputs to a NAND-gate 133 which in turn provides an input to the NAND-gate 131 via an inverter 134. The NAND-gates 148, 131, and 133 and the inverters 133 and 134 comprise logic circuits interconnected to detect the simultaneous occurrence of a trapezoidal correction quantity associated with $dx_1$ and $dy_1$ and a trapezoidal correction quantity associated with $dx_2$ and $dy_2$.

The $S_{xI}$-signal provides an input to a NAND-gate 135 and also provides an input to a NAND-gate 136 via an inverter 137. Similarly, the $S_{yI}$-signal provides an input to the NAND-gate 136 and also provides an input to the NAND-gate 135 via an inverter 138. In a similar manner the $S_{x2}$-signal provides an input to a NAND-gate 139 and also provides an input to a NAND-gate 140 via an inverter 141. The $S_{y2}$-signal provides an input to the NAND-gate 140 and also provides an input to the NAND-gate 139 via an inverter 142. The outputs of the NAND-gates 135 and 136 are connected in a wired AND configuration which in turn provides an input to a NAND-gate 145 and also provides an input to a NAND-gate 146 via an inverter 147. Similarly, the outputs of the NAND-gates 139 and 140 are connected in a wired AND configuration which in turn provides an input to the NAND-gate 146 and also provides an input to the NAND-gate 145 via an inverter 149. The outputs of the NAND-gates 145 and 146 are in turn connected in a wired AND configuration which provides an input 152 to the NAND-gate 131. The NAND-gates 135, 136, 139, 140, 145, and 146 and the inverters 137, 138, 141, and 142 are logically interconnected to determine if two simultaneously occurring trapezoidal correction quantities have the same sign with respect to each other.

If two trapezoidal correction quantities occur simultaneously with respect to each other, inputs 150 and 151 to the NAND-gate 131 will provide enabling signal thereto as previously explained. If the signs of the two simultaneously occurring trapezoidal correction quantities are the same with respect to each other, the input 152 will provide a third enabling signal to the NAND-gate 131 thus enabling the gate. If, however, the signs of the two simultaneously occurring trapezoidal correction quantities are different with respect to each other, the input 152 will disable the NAND-gate 131. The NAND-gate 131 provides an input to the gate 153 which in turn provides a signal representative of the simultaneous occurrence of two trapezoidal correction quantities having the same sign with respect to each other.

A NAND-gate 154 receives input signals from the inverters 132 and 147 and NAND-gate 155 receives input signals from the inverters 134 and 149. The outputs of the NAND-gates 154 and 155 are connected in a wired AND configuration which in turn provides a signal, via an inverter 156, representative of the sign of simultaneously occurring trapezoidal correction quantities which have the same sign with respect to each other.

The inputs to a NAND-gate 160 are provided respectively from the outputs of the NAND-gates 148 and 133 and the inputs to a NAND-gate 161 or provided respectively by the logical inverses of the outputs of the NAND-gates 148 and 133. The outputs of the NAND-gates 160 and 161 are connected in a wired AND configuration which in turn provides an input to a NAND-gate 162. The signal provided by the wired AND output of the NAND-gates 160 and 161 is representative of the existence of singly occurring trapezoidal correction quantities. The wired AND output of the NAND-gates 160 and 161 is applied to the S and C inputs of a flip-flop 163. The Q output of the flip-flop 163 is applied as an input to the NAND-gate 162. The flip-flop 163 receives its trigger input signals from a NAND-gate 164 via an inverter 165. The NAND-gate 164, in turn, receives its input signals from the second word time pulse source 16 and the most significant bit time pulse source 14 thereby providing timing signals to the flip-flop 163. The flip-flop 163 is utilized to store the occurrences of singly occurring trapezoidal correction quantities in a manner to be described. The Q output of the flip-flop 163 provides a signal to the NAND-gate 162 via a conductor 251 which signal is representative of a singly occurring trapezoidal correction quantity stored in the flip-flop 163.

The NAND-gates 154 and 155, via the inverter 156, as previously explained, provide a signal representative of the sign of simultaneously occurring trapezoidal correction quantities having the same sign with respect to each other. In addition, the signal provided by the NAND-gates 154 and 155 may also be representative of the polarity of a singly occurring trapezoidal correction quantity. This signal is applied to an S input of a flip-flop 166 and the inverse of the signal is applied to a C input thereof. The trigger input to the flip-flop 166 receive the same timing signals as does the trigger input of the flip-flop 163 which signals are provided, as previously described, by the NAND-gate 164 via the inverter 165. The flip-flop 166 is utilized to store the polarity of the singly occurring trapezoidal correction quantity that may be stored in the flip-flop 163, as previously discussed.

The Q-output of the flip-flop 166 is connected as an input to a NAND-gate 167 which in addition receives an input signal from the wired AND output of the NAND-gates 154 and 155. The $\overline{Q}$-output of the flip-flop 166 is connected as an input to a NAND-gate 170 which in addition receives an input from the inverter 156. The outputs of the NAND-gates 167 and 170 are connected in a wired AND configuration which in turn provides an input to the NAND-gate 162 via a conductor 252. The NAND-gates 167 and 170 are utilized to compare the polarity of a singly occurring trapezoidal correction quantity with the polarity of a trapezoidal correction quantity previously stored in the flip-flop 163 which polarity is stored in the flip-flop 166. Therefore, when two successively occurring trapezoidal correction quantities have the same sign with respect to each other, an enabling input is provided to the NAND-gate 162 via the conductor 252, whereas when two successively occurring trapezoidal correction quantities have opposite signs with respect to each other, a disabling input is provided to the NAND-gate 162 via the conductor 252. Thus, in a manner to be explained, the NAND-gate 162 provides an input signal to the gate 153 which signal is representative of the existence of two sequentially occurring trapezoidal correction quantities having the same sign with respect to each other. In addition, the inverter 156 provides a signal representative of the polarity of the two sequentially occurring trapezoidal correction quantities having the same polarity with respect to each other.

The gate 153 receives an input signal from the NAND-gate 162 which signal is representative of the existence of two sequentially occurring trapezoidal correction quantities having the same sign with respect to each other. In addition, as previously described, the gate 153 receives an input signal from the NAND-gate 131 which signal is representative of two simultaneously occurring trapezoidal correction quantities having the same sign with respect to each other. The output signal provided by the gate 153 is, therefore, representative of the sum of two trapezoidal correction quantities having the same signs with respect to each other, which occur either simultaneously or sequentially with respect to each other. The output signal from the gate 153 is provided as an input to a NAND-gate 171 which also receives input signals from the least significant bit time pulse source 15 and the second word time pulse source 16 respectively. The NAND-gate 171 therefore provides a signal during the least significant bit time of the second word time of the computation cycle which signal is representative of combined trapezoidal correction quantities as previously discussed.

The outputs of the NAND-gates 126 and 171 are combined in a wired AND configuration which provides the $Y'_1$-output signal of the multi-input rectangular integration and trapezoidal correction circuit 316 via an inverter 127.

The signal provided by the inverter 156, which signal is representative of the sign of the trapezoidal correction quantities is applied as an input to a NAND-gate 173. The NAND gate is also responsive to the second word time pulse source 16. The outputs of the NAND-gates 128 and 173 are connected in a wired AND configuration which provides the $S'_{x1}$-output signal of the multi-input rectangular integration and trapezoidal circuit 116 via an inverter 129.

An R-shift register 180 is included in the integrator of the present invention for storing the R-quantity which comprises, for example, a binary number. The clock pulse source 10, connected to the shift register 180, provides the shifting pulses as illustrated by waveform A of FIG. 4, for shifting the R-binary number therethrough.

The output, $R_R$, of the R-shift register 180 is connected as an input to the adder-subtractor circuit 319 to which the R-quantity, $R_R$, is applied in bit serial fashion in response to the shifting pulses provided by the clock pulse source 10. The bits of the R-quantity are shifted into the adder-subtractor circuit 319 in the order of increasing significance.

The multi-input rectangular integration and trapezoidal correction circuit 316 provides the $Y_2'$-signal as inputs to the adder-subtractor circuit 319 as previously explained. The $Y_2'$-signal comprises, for example, a binary number and is provided to the adder-subtractor circuit 319 in bit serial fashion in the order of increasing bit significance.

During the first word time of the computation cycle, the adder-subtractor circuit 319 combines the $Y_2'$-signal with the R-signal in serial arithmetic fashion. The $S_{x2}'$-signal determines whether the $Y_2'$-signal is added to the R-signal or subtracted therefrom in the manner previously explained with respect to FIG. 1.

During the second word time of the computation cycle, the $Y_2'$-signal has a numerical value of zero as previously explained. Therefore, during the second word time, the adder-subtractor circuit 319 combines zero with the $R_R$-quantity, thereby not altering the numerical value of the $R_R$-quantity during the second word time.

The adder-subtractor circuit 319 provides the $\overline{R}_{W2}$-signal representative of the combined $Y_2'$-signal and R-signal. The $\overline{R}_{W2}$-signal is applied via an inverter 181, in bit serial fashion to an input of the adder-subtractor circuit 318. The adder-subtractor circuit 319 also provides the $CR_2$-signal representative of the carry produced either during the first word time or the second word time of the computation cycle. The adder-subtractor circuit 319 comprises, for example, a conventional serial arithmetic circuit of the type previously described with respect to FIG. 1.

The output $R_{W2}$ of the adder-subtractor circuit 319 is connected as an input to the adder-subtractor circuit 318 to which the $R_{W2}$-quantity is applied in bit serial fashion in the order of increasing bit significance. In addition, the multi-input rectangular integration and trapezoidal correction circuit 316 provides the $Y_1'$-signal and the $S_{x1}'$-signal as inputs to the adder-subtractor circuit 318. The $Y_1'$-signal comprises, for example, a binary number and is provided to the adder-subtractor circuit 318 in bit serial fashion in the order of increasing bit significance.

During the first word time of the computation cycle, the adder-subtractor circuit 318 combines the $Y_1'$-signal with the $R_{W2}$-signal in serial arithmetic fashion. The $S_{x1}'$-signal determines whether the $Y_1'$-signal is added to the $R_{W2}$-signal or is subtracted therefrom in the manner previously explained with respect to FIG. 1.

During the second word time of the computation cycle, the adder-subtractor circuit 318 combines the $Y_1'$-signal, which during the second word time represents a correction quantity, as previously explained, with the $R_{W2}$-quantity in serial arithmetic fashion. The correction quantity is combined with the $R_{W2}$-quantity, in a manner to be explained, in accordance with the $S_{x1}'$-signal, which during the second word time is representative of the sign of the correction quantity.

The adder-subtractor circuit 318 provides the $\overline{R}_{W1}$-signal representative of the combined $Y_1'$-signal and $R_{W2}$-signal. The $\overline{R}_{W1}$-signal is applied via an inverter 182, in bit serial fashion to the input of the R-shift register 180. The adder-subtractor circuit 318 also provides the $CR_1$ signal representative of the carry produced either during the first word time or the second word time of the computation cycle. The adder-subtractor circuit 318 comprises, for example, a conventional serial arithmetic circuit of the type previously described with respect to FIG. 1.

The adder-subtractor circuit 318 and the R-shift register 180 comprise a conventional series connected arithmetic circuit for arithmetically combining the $R_R$-quantity, the $Y_2'$-quantity and the $Y_1'$-quantity in one arithmetic word time.

The $CR_1$-signal provided by the adder-subtractor circuit 318 and the $CR_2$-signal provided by the adder-subtractor circuit 319 are applied as inputs to an overflow circuit 183. The $Y_1'$-signal, the $S_{x1}'$-signal, the $Y_2'$-signal the $S_{x2}'$-signal are also provided as inputs to the circuit 183. Control signals are provided to the circuit 183 by the clock pulse source 10 and the most significant bit time pulse source 14. The respective control signals are illustrated by waveforms A and D of FIG. 4.

The overflow circuit 183 provides, to other integrators of the DDA computation system, a $dz$-output signal and a $S_z$-output signal on the conductors 100 and 101, respectively.

The $dz$-signal is representative of the existence or absence of an overflow resulting from combining the $Y_1$-quantity, the $Y_2$-quantity and the R-quantity during the first word time or adding the correction quantity to the R-quantity during the second word time. The existence or absence of a $dz$-increment is represented by a binary ONE or a binary ZERO, respectively, on the $dz$-conductor 100. A positive or a negative $dz$-increment is represented by a binary ZERO or a binary ONE on the $S_z$-conductor 101.

It is to be appreciated that the overflow circuit 183 is comprised substantially of two overflow circuits of the character previously illustrated and described with respect to the overflow circuit 90 of FIG. 1, each circuit being separately responsive to its associated set of input signals.

The portion of the overflow circuit 183 that is utilized for detecting the overflows associated with the adder-subtractor circuit 318 is comprised of NAND-gates 185, 186, 187 and 188 as well as inverters 190, 191, 192, 193 and 194. The $CR_1$-signal and the $\overline{CR_1}$-signal from the adder-subtractor circuit 318 are provided respectively as inputs to the NAND-gates 185 and 186. The $Y_1'$-signal from the multi-input rectangular integration and trapezoidal correction circuit 316 is provided as an input to the NAND-gate 186 and via the inverter 190 as an input to the NAND-gate 185. The outputs of the NAND-gates 185 and 186 are connected in a wired AND configuration to provide a signal representative of the existence of a carry from the adder-subtractor circuit 318. The NAND-gates 185 and 186 perform the same function in the overflow circuit 183 that the NAND-gates 91 and 92 perform in the overflow circuit 90, of FIG. 1.

The $Y_1'$-signal from the multi-input rectangular integration and trapezoidal correction circuit 316 is applied as an input to the NAND-gate 187 and through the inverter 192 as an input to the NAND-gate 188. Similarly, the $S_{z1}'$-signal is applied as an input to the NAND-gate 188 and through the inverter 191 as an input to the NAND-gate 187. The outputs of the NAND-gates 187 and 188 are connected in a wired AND configuration to provide, via the inverter 194, a signal representative of the sign of the overflow from the adder-subtractor circuit 318. The NAND-gates 187 and 188 perform the same function in the overflow circuit 183 as is performed by the NAND-gates 96 and 97 in the overflow circuit 90 of FIG. 1.

The portion of the overflow circuit 183 that is utilized for detecting the overflows associated with the adder-subtractor circuit 319 is comprised of NAND-gates 200, 201, 202 and 203 as well as inverters 204, 205, 206, 207 and 208. The $CR_2$-signal and the $\overline{CR_2}$-signal from the adder-subtractor circuit 319 are provided respectively as inputs to the NAND-gates 200 and 201. The $Y_2'$-signal from the multi-input rectangular integration and trapezoidal correction circuit 316 is provided as an input to the NAND-gate 201 and via the inverter 204 as an input to the NAND-gate 200. The outputs of the NAND-gates 200 and 201 are connected in a wired AND configuration to provide a signal representative of the existence of a carry from the adder-subtractor circuit 319. The NAND-gates 200 and 201 perform the same function in the overflow circuit 183 that the NAND-gates 91 and 92 perform in the overflow circuit 90 of FIG. 1.

The $Y_2'$-signal from the multi-input rectangular integration and trapezoidal correction circuit 316 is applied as an input to the NAND-gate 202 and through the inverter 206 as an input to the NAND-gate 203. Similarly, the $S_{z2}'$-signal is applied as an input to the NAND-gate 203 and through the inverter 205 as an input to the NAND-gate 202. The outputs of the NAND-gates 202 and 203 are connected in a wired AND configuration to provide, via the inverter 208, a signal representative of the sign of the overflow from the adder-subtractor circuit 319. The NAND-gates 202 and 203 perform the same function in the overflow circuit 183 as is performed by the NAND-gates 96 and 97 in the overflow circuit 90 of FIG. 1.

The wired AND output of the NAND-gates 185 and 186 and the wired AND output of the NAND-gates 200 and 201 provide input signals to a gate 210. The gate 210 provides an output signal representative of the occurrence of an overflow from either the adder-subtractor circuit 318 or the adder-subtractor circuit 319. It is to be appreciated that the scaling of the DDA system in which the integrator of the present invention is included should be such that an overflow from the adder-subtractor 318 should not occur simultaneously with an overflow from the adder-subtractor 319. The output of the gate 210 is applied to the S-input of a flip-flop 211 and via an inverter 212 to the C-input thereof. The flip-flop 211 is set to the Q-state whenever an overflow existence signal is provided by the gate 210. The flip-flop 211 receives timing signals at its T-input from the most significant bit time pulse source 15 and the clock pulse source 10 via the serially connected NAND-gate 213 and inverter 214. The Q-output of the flip-flop 211 provides the $dz$-signal on the conductor 100 as previously described with respect to the overflow circuit 90 of FIG. 1.

The outputs of the inverters 194 and 208 are applied respectively as inputs to NAND-gates 215 and 216. The NAND-gates 215 and 216 also receive inputs respectively from the inverters 193 and 207. The outputs of the NAND-gates 215 and 216 are connected in a wired AND configuration. The NAND-gates 215 and 216 are utilized to transmit a signal representative of the polarity of the associated $dz$-overflow signal transmitted through the gate 210 and to block erroneous polarity signals that may be generated by the polarity logic gates of the overflow circuit 183 in response to the output signals provided from the multi-input rectangular integration and trapezoidal correction circuit 316, in a manner to be explained.

The wired AND output of the NAND-gates 215 and 216 provide a signal to the C-input of a flip-flop 217 and via an inverter 218 to the S-input thereof. The timing signals applied to the T-input of the flip-flop 217 are provided by the inverter 214 in the manner described with respect to the flip-flop 211. The Q-output of the flip-flop 217 provides the $S_z$-signal on the conductor 101 as previously described with respect to the overflow circuit 90 of FIG. 1, which signal is representative of the sign of the $dz$-signal provided by the flip-flop 211.

In operation, the integrator illustrated in FIG. 3 of a DDA computation system may be conditioned to perform a computation by setting the Y-quantities and the R-quantity to proper initial values in the manner described with respect to FIG. 1.

During the first and second word times of a computation cycle, the $Y_1$-quantity stored in the $Y_1$-shift register 310 is incremented or decremented in accordance with the $dy_1$- and $S_{y1}$-signals by means of the circuit 311. A binary ZERO on the $S_{y1}$-conductor 313 renders the circuit 311 additive and a binary ONE on the $S_{y1}$-conductor 313 renders the circuit 311 subtractive in the manner previously explained with respect to FIGS. 1 and 2.

The $Y_1$-binary number is serially shifted into the incrementing-decrementing circuit 311 in the order of increasing bit significance. The order of the least significant bit of the $Y_1$-binary number has a numerical significance of unity. The incrementing-decrementing circuit 311 adds or subtracts unity from the $Y_1$-quantity when a $dy_1$-increment exists. The pulse source 15 enables the NAND-gate 314 during the least significant bit time thereby permitting the $dy_1$-signal on the conductor 312 to pass therethrough providing a signal of unit significance for the arithmetic operation in a manner similar to that previously described with respect to FIGS. 1 and 2. The $Y_{1/1}$-signal, which represents the incremented or decremented $Y_1$-quantity, is shifted back into the $Y_1$-shift register 310. The incrementation or decrementation of the $Y_1$-quantity is performed during both the first and second word times of each computation cycle.

In addition, during the first and second word times of the computation cycle, the $Y_2$-quantity stored in the $Y_2$-shift register 317 is incremented or decremented in accordance with the $dy_2$- and $S_{y2}$-signals by means of the circuit 320. A binary ZERO on the $S_{u2}$-conductor 122 renders the circuit 320 additive and a binary ONE on the $S_{u2}$-conductor 122 renders the circuit 320 subtractive in the manner previously explained with respect to FIGS. 1 and 2.

The $Y_2$-binary number is serially shifted into the incrementing-decrementing circuit 320 in the order of increasing bit significance. The order of the least significant bit of the $Y_2$-binary number has a numerical significance of unity. The incrementing-decrementing circuit 320 adds or subtracts unity from the $Y_2$-quantity when a $dy_2$-increment exists. The pulse source 15 enables the NAND-gate 123 during the least significant bit time thereby permitting the $dy_2$-signal on conductor 121 to pass therethrough providing a signal of unit significance for the arithmetic operation in a manner similar to that previously described with respect to FIGS. 1 and 2. The $Y_{w2}$-signal, which represents the incremented or decremented $Y_2$-quantity, is shifted back into the $Y_2$-shift register 317. The incrementation or decrementation of the $Y_2$-quantity is performed during both the first and second word times of each computation cycle.

The $Y_{w1}$-signal and the $Y_{w2}$-signal are provided to the multi-input rectangular integration and trapezoidal correction circuit 316 via the inverters 315 and 124, respectively, as previously explained.

During the first word time of the computation cycle, the first word time pulse source 17 provides an enabling signal to the NAND-gate 126 of the multi-input rectangular integration and trapezoidal correction circuit 316. The $dx_1$-conductor 143 also provides an enabling signal to the NAND-gate 126 when a $dx_1$-increment exists. Therefore, during the first word time when a $dx_1$-increment exists, the $Y_{w1}$-signal passes through the NAND-gate 126 to provide the $Y_1'$-signal, via the inverter 127, to the adder-subtractor circuit 318.

The signal provided by the first word time pulse source 17 also enables the NAND-gate 128 during the first word time of the computation cycle. Therefore, during the first word time, the $S_{r1}$-signal on conductor 144 passes therethrough to provide the $S_{x1}$-signal via the inverter 129 to the adder-subtractor circuit 318.

Also during the first word time of the computation cycle, the first word time pulse source 17 provides an enabling signal to the NAND-gate 130 of the multi-input rectangular integration and trapezoidal correction circuit 316. The $dx_2$-conductor 147 also provides an enabling signal to the NAND-gate 130 when a $dx_2$-increment exists. Therefore, during the first word time when a $dx_2$-increment exists, the $Y_{w2}$-signal passes through the NAND-gate 130 to provide the $Y_2'$-signal, via the inverter 131, to the adder-subtractor circuit 319.

The $S_{r2}$-signal appearing on the conductor 125 is applied directly as the $S_{x2}'$-signal to the adder-subtractor control input of the adder-subtractor circuit 319.

During the first word time, the adder-subtractor circuit 319 is rendered additive or subtractive in accordance with the $S'_{r2}$-signal being in the binary ZERO state or in the binary ONE state respectively. The $R_R$-signal, from the R-shift register 180 is applied in bit serial fashion, in the order of increasing bit significance, to the adder-subtractor circuit 319. The circuit 319 combines the $Y'_2$-signal with the $R_R$-signal providing the $R_{w2}$-signal via the inverter 181 in the manner previously explained. The $R_{w2}$-signal is in turn applied as an input to the adder-subtractor circuit 318.

The adder-subtractor circuit 318 is rendered additive or subtractive in accordance with the $S'_{r1}$-signal being in the binary ZERO state or in the binary ONE state respectively. The $R_{w2}$-signal, from the adder-subtractor circuit 319 is applied in bit serial fashion, in the order of increasing bit significance, to the adder-subtractor circuit 318. The circuit 318 combines the $Y_1$-signal with the $R_{w2}$-signal providing the $R_{w1}$-signal via the inverter 182 in the manner previously explained. The $R_{w1}$-signal is then shifted back into the R-shift register 180.

In this manner the adder-subtractor circuits 318 and 319 combine the $Y'_1$-quantity, the $Y'_2$-quantity and the R-quantity during the first word time of the computation cycle.

During the most significant bit time of the first word time of the computation cycle the overflow circuit 183 examines the states of the carry flip-flops of the adder-subtractor circuits 318 and 319, the states of the $S'_{r1}$-signal and the $S'_{r2}$-signal and the polarities of the $Y'_1$-signal and the $Y'_2$-signal thereby determining the existence and polarity of any overflow from the adder-subtractor circuits 318 and 319 that may have occurred during the first word time of the computation cycle in the manner previously described. The overflow signal is stored in the flip-flop 211 and the polarity thereof in the flip-flop 217 thereby providing the $dz$- and $S_z$-signals on the conductors 100 and 101 respectively.

As previously explained, the overflow circuit 183 comprises substantially two circuits of the character of the overflow circuit 90 previously illustrated and described with respect to FIG. 1. The operation, therefore, of the overflow circuit 183 is substantially identical to that of the overflow circuit 90 with respect to each of the two sets of input signals applied thereto with the exception of the NAND-gates 215 and 216.

As previously explained, the adder-subtractor circuits 318 and 319 may not provide simultaneously occurring overflows with respect to each other. However, although an overflow from a particular adder-subtractor circuit may not exist, the associated polarity signal, which would then be meaningless, may exist. This meaningless polarity signal when combined with the meaningful polarity signal may provide an erroneous polarity signal with respect to the existent overflow. It is the function of the NAND-gates 215 and 216 to block this erroneous polarity signal. If, for example, the adder-subtractor circuit 318 provides an overflow and the adder-subtractor circuit 319 does not provide an overflow during a particular computation cycle, the polarity existence signal provided via the inverter 193 will enable the NAND-gate 215 thereby transmitting the polarity signal associated with the overflow from the adder-subtractor circuit 318 which signal is provided via the inverter 194. The overflow nonexistence signal associated with the adder-subtractor circuit 319 and provided via the inverter 207 disables the NAND-gate 216 thereby blocking the erroneous polarity signal associated with the adder-subtractor circuit 319 provided via the inverter 208.

During the second word time of the computation cycle, the multi-input rectangular integration and trapezoidal correction circuit 316 provides a summed correction quantity in response to two simultaneously occurring trapezoidal correction quantities having the same sign with respect to each other, or provides an accumulated correction quantity in response to two sequentially occurring trapezoidal correction quantities having the same sign with respect to each other.

The NAND-gate 148 provides a signal representative of the existence of a trapezoidal correction quantity associated with the $dx_1$- and the $dy_1$-signals. Similarly, the NAND-gate 133 provides a signal representative of the existence of a trapezoidal correction quantity associated with the $dx_2$- and $dy_2$-signals. The NAND-gate 131 provides a signal representative of the existence of two simultaneously occurring trapezoidal correction quantities which have the same sign with respect to each other. Whenever two correction quantities exist simultaneously with respect to each other, the inputs 150 and 151 to the NAND-gate 131 provide enabling signals therefor. If the two trapezoidal correction quantities have the same sign with respect to each other, the signal on the conductor 152 will enable the NAND-gate 131 but, however, should the two simultaneously occurring trapezoidal correction quantities have opposite signs with respect to each other, the signal on the conductor 152 will disable the NAND-gate 131.

The polarity signal on the conductor 152 of the NAND-gate 131 is generated in the following manner. The NAND-gates 135 and 136 provide a signal representative of the sign of a trapezoidal correction quantity associated with the $dx_1$- and $dy_1$-signals. The NAND-gates 139 and 140 provide a signal representative of the sign of a trapezoidal correction quantity associated with the $dx_2$- and $dy_2$-signals. The NAND-gates 145 and 146 compare these signals representative of the signs of the two simultaneously occurring trapezoidal correction quantities thereby providing the enabling or disabling signal on the conductor 152 of the NAND-gate 131 as previously described.

Whenever two trapezoidal correction quantities exist simultaneously with respect to each other and have the same sign with respect to each other, the NAND-gate 131 is enabled thereby providing a signal to the NAND-gate 171 via the gate 153. The NAND-gate 171 provides an output during the least significant bit time of the second word time of a computation cycle whenever the NAND-gate 131 is enabled. In this manner, a summed correction quantity representative of two simultaneously occurring trapezoidal correction quantities having the same sign with respect to each other is provided via the inverter 127 as the $Y_t'$-signal. This summed correction quantity has a numerical significance of unity for reasons to be explained.

Whenever two simultaneously occurring trapezoidal correction quantities exist having the same sign with respect to each other, the NAND-gates 154 and 155 provide a signal representative of this sign in the manner previously explained. This sign signal is provided as an input to the NAND-gate 173 via the inverter 156. The NAND-gate 173 is also responsive to the second word time pulse source 16 as previously explained. Therefore, the NAND-gate 173 provides the $S_{xt'}$-signal via the inverter 129, which signal is representative of the polarity of two similarly signed simultaneously existent trapezoidal correction quantities whose existence is represented by the $Y_1'$-signal.

The NAND-gates 160 and 161, which are responsive to the outputs of the NAND-gates 148 and 133, provide a signal representative of singly occurring trapezoidal correction quantities as previously explained. Therefore, whenever a singly existent trapezoidal correction quantity occurs, the flip-flop 163 is toggled in response to the timing signal provided by the NAND-gate 164. If the singly occurring trapezoidal correction quantity is the first of a pair of sequentially occurring trapezoidal correction quantities, the flip-flop 163 is toggled from the $\overline{Q}$-state to the Q-state thereby storing the existence of this first occurring trapezoidal correction quantity. The Q-output of the flip-flop 163 provides an enabling signal to the NAND-gate 162 via the conductor 251 for reasons to be explained.

As previously discussed, the NAND-gates 154 and 155 provide a signal representative of the polarity of the singly occurring trapezoidal correction quantity, which signal is stored in the flip-flop 166 in response to the timing signal provided to the T-input thereof. If the sign of the singly occurring trapezoidal correction quantity is positive, the flip-flop 166 is set to the $\overline{Q}$-state and if the sign thereof is negative, the flip-flop 166 is set to the Q-state.

When the second trapezoidal correction quantity of the pair of sequentially occurring trapezoidal correction quantities occurs, the NAND-gates 160 and 161 provide an enabling signal via the conductor 250 to the NAND-gate 162. The existence signal stored in the flip-flop 163 representative of the first occurring trapezoidal correction quantity of the pair of sequentially occurring quantities, provides an enabling signal to the NAND-gate 162 via the conductor 251. The NAND-gates 167 and 170, as previously explained, compare the sign of the first occurring trapezoidal correction quantity stored in the flip-flop 166 with the sign of the second occurring trapezoidal correction quantity provided by the NAND-gates 154 and 155. If the two signs are the same with respect to each other, the NAND-gates 167 and 170 provide an enabling signal to the NAND-gate 162 via the conductor 252 and if the signs are different with respect to each other, the NAND-gates 167 and 170 provide a disabling input to the NAND-gate 162 via the conductor 252. Therefore, should two trapezoidal correction quantities having the same sign with respect to each other occur sequentially, the NAND-gate 162 is enabled thereby providing an input to the NAND-gate 171 via the gate 153. The NAND-gate 171, as previously explained, is also responsive to the least significant bit time pulse source 15 and the second word time pulse source 16. Therefore, the NAND-gate 171 provides the $Y_1'$-signal during the least significant bit time of the second word time via the inverter 127 which signal is representative of two sequentially occurring trapezoidal correction quantities having the same sign with respect to each other.

When the NAND-gates 160 and 161 provide the signal representative of the second occurring trapezoidal correction quantity of the pair of sequentially occurring trapezoidal correction quantities, the flip-flop 163 is toggled back to the $\overline{Q}$-state during the most significant bit time of the second word time in accordance with the timing signals provided to the T-input thereof by the NAND-gate 164.

Since the NAND-gates 154 and 155 provide a signal representative of the sign of the second occurring trapezoidal correction quantity of the pair of sequentially occurring quantities having the same sign with respect to each other, a signal representative of this sign is provided as an input to the NAND-gate 173. Since the NAND-gate 173 is also responsive to the second word time pulse source 16, a signal representative of the polarity of the two sequentially occurring trapezoidal correction quantities having the same sign with respect to each other is provided via the inverter 129 during the second word time as the $S_{xt'}$-signal.

The $Y_1'$-signal, as previously explained, is representative of the existence of either two simultaneously occurring trapezoidal correction quantities having the same sign with respect to each other or of two sequentially occurring trapezoidal correction quantities having the same sign with respect to each other and the $S_{xt'}$-signal is representative of the sign associated therewith. As previously explained, the $Y_2'$-signal provided by the multi-input rectangular integration and trapezoidal correction circuit 316 has a numerical value of zero during the second word time.

As previously discussed, the $Y_1'$-signal provides an input to the adder-subtractor circuit 318 and the $S_{xt'}$-signal provides a control input therefor. In addition, the $Y_2'$-signal provides an input to the adder-subtractor circuit 319 and the $S_{x2'}$-signal provides a control input therefor. During the second word time of the computation cycle, the R-quantity is shifted into the adder-subtractor circuit 319 in bit serial fashion in the order of increasing bit significance. The adder-subtractor circuit 319 combines the $Y_2'$-signal with the R-quantity in accordance with the $S_{x2'}$-signal in the manner previously described with respect to FIGS. 1 and 2. Since, however, the $Y_2'$-signal has a numerical significance of zero, the R-quantity remains unaltered.

The $R_{tc2}$-output from the adder-subtractor circuit 319 is provided as an input to the adder-subtractor circuit 318 which, as explained, receives the $Y_1'$-quantity as another input. The adder-subtractor circuit 318 therefore combined the $Y_1'$-quantity with the R-quantity during the second word time in the conventional manner of a serial adder-subtractor circuit as previously explained with respect to FIGS. 1 and 2. Since during the second word time, the $Y_1'$-quantity is provided during the least significant bit time thereof and is representative of two trapezoidal correction quantities having the same sign with respect to each other, unity is added to or subtracted from the R-quantity whenever the $Y_1'$-signal exists during the second word time.

The corrected R-quantity represented by the $R_{tc1}$-signal is then shifted back into the R-shift register 180.

The overflow circuit 183 which is responsive to the $CR_1$-signal, the $Y_1'$-signal, the $S_{xt'}$-signal, the $Y_2'$-signal and the $S_{x2'}$-signal provides the $dz$-output signal and the $S_z$-output signal on the conductors 100 and 101 respectively in the manner previously explained with respect to the operation of the device during word time one.

It should be appreciated with respect to the three embodiments of the invention described hereinabove that the R-shift register and the associated adder-subtractor circuit, for example the R-shift register 32 and the adder-subtractor 33 of FIG.

1, may be designated as an R-accumulator for accumulating the Rlquantity. Similarly, the Y-shift register and the associated incrementing-decrementing circuit, for example the Y-shift register 72 and the incrementing-decrementing circuit 73 of FIG. 1, may be designated as a Y-accumulator for accumulating the Y-quantity. Additionally, the circuits 50, 107 and 316 of FIGS. 1, 2 and 3, respectively, may be designated as logic circuits for coupling the Y-accumulators to the R-accumulators, respectively. Furthermore, each accumulator may be designated as comprising a storage shifting register and an associated arithmetic circuit, for example the R-shift register 32 and the adder-subtractor circuit 33, comprising the R-accumulator of FIG. 1.

Although the three species of the present invention disclosed in this application have been described in terms of a trapezoidal integration algorithm, it will be appreciated that other species within the purview of the present invention may be instrumented. For example, a reversible rectangular integration algorithm may be realized by performing rectangular integration during the first word time of the computation cycle, as described with respect to the disclosed embodiments, and a correction quantity having a numerical significance of $dx \cdot dy$ may be combined with the integrand during the second word time whenever the sign of the independent variable is positive. When the sign of the independent variable is negative, the integrand may remain unaltered during the second word time. Reversible computation may thus be achieved.

It will further be appreciated that although the three embodiments of the present invention are illustrated utilizing discrete logic components, other embodiments within the scope of the invention are possible. For example, a magnetic drum may be utilized for the storage of the various numerical quantities.

While the invention has been described in its preferred embodiments, it is to be understood that the words which have been used are words of description rather than limitation and that changes may be made without departing from the true scope and spirit of the invention in its broader aspects.

We claim:

1. A digital differential analyzer integrator having a computation cycle including first and second intervals and being responsive to a $dx$-signal and a $dy$-signal representative of $dx$- and $dy$-numerical increments, respectively, comprising R-accumulator means for accumulating a numerically valued R-quantity, Y-accumulator means responsive to said $dy$-signal for accumulating a numerically valued Y-quantity in accordance therewith, logic means coupling said Y-accumulator means to said R-accumulator means and responsive to said $dx$-signal and $dy$-signal for transmitting said Y-quantity to said R-accumulator means during said first interval in accordance with said $dx$-increment for combination therein with said R-quantity and for providing a correction quantity in accordance with said $dx$- and $dy$-signals to said R-accumulator means for combination therein with said R-quantity during said second interval, and overflow means coupled to said R-accumulator means for providing signals representative of the overflow thereof in response to said combination of said Y-quantity with said R-quantity.

2. An integrator of the character recited in claim 1 wherein said integrator utilizes a trapezoidal integration algorithm, and said correction quantity is a trapezoidal correction quantity representative of one-half of the algebraic product of said $dx$- and said $dy$-numerical increments.

3. An integrator of the character recited in claim 2 wherein said R-accumulator means comprises R-storage means for storing said R-quantity, and R-arithmetic means coupled with said R-storage means for algebraically adding said Y-quantity to said R-quantity when said $dx$-increment is positive and algebraically subtracting said Y-quantity from said R-quantity when said $dx$-increment is negative during said first interval and for algebraically adding said trapezoidal correction quantity to said R-quantity during said second interval.

4. An integrator of the character recited in claim 3 wherein said R-arithmetic means further includes means for maintaining said R-quantity unaltered when said $dx$-increment has a value of zero.

5. An integrator of the character recited in claim 1 wherein said Y-accumulator means comprises Y-storage means for storing said Y-quantity, and Y-arithmetic means coupled with said Y-storage means and responsive to said $dy$-signal for altering said Y-quantity during both said first and second intervals in accordance with said $dy$-increment.

6. An integrator of the character recited in claim 5 wherein said Y-arithmetic means comprises means for algebraically increasing said Y-quantity when said $dy$-increment is positive and algebraically decreasing said Y-quantity when said $dy$-increment is negative.

7. An integrator of the character recited in claim 6 wherein said means for algebraically increasing and decreasing said Y-quantity further includes means for maintaining said Y-quantity unaltered when said $dy$-increment has a value of zero.

8. An integrator of the character recited in claim 3 wherein said R-quantity and said Y-quantity are binary numbers, and said first and second intervals each comprise one arithmetic word time with respect to said R-quantity.

9. An integrator of the character recited in claim 8 wherein said $dx$-increment has a numerical magnitude equal to the numerical magnitude of the lowest order of said R-quantity and said $dy$-increment has a numerical magnitude equal to the numerical magnitude of the second lowest order of said R-quantity, and said R-storage means further includes a storage stage normally storing the bit of said R-quantity having a numerical significance of said lowest order of said R-quantity for combining said trapezoidal correction quantities with said R-quantity.

10. An integrator of the character recited in claim 8 wherein said logic means further includes correction storage means for storing said trapezoidal correction quantities and providing an accumulated correction quantity when two successively occurring nonzero trapezoidal correction quantities have the same sign with respect to each other and inhibiting said accumulated correction quantity when two successively occurring nonzero trapezoidal correction quantities have different signs with respect to each other.

11. An integrator of the character recited in claim 10 wherein said accumulated correction quantity has a value representative of the algebraic sum of said two successively occurring nonzero trapezoidal correction quantities, and said accumulated correction quantities provided by said correction storage means are algebraically added to said R-quantity during said second interval by said R-arithmetic means.

12. An integrator of the character recited in claim 11 with said integrator responsive to a plurality of $dx$-signals and a plurality of $dy$-signals wherein said logic means further includes means for comparing simultaneously occurring trapezoidal correction quantities and providing a summed correction quantity when two said simultaneously occurring trapezoidal correction quantities have the same sign with respect to each other and inhibiting said summed correction quantity when two said simultaneously occurring trapezoidal correction quantities have different signs with respect to each other.

13. An integrator of the character recited in claim 12 wherein said summed correction quantity has a value representative of the algebraic sum of said two simultaneously occurring trapezoidal correction quantities, and said summed correction quantities are algebraically added to said R-quantity during said second interval by said R-arithmetic means.

14. A digital differential analyzer integrator having a computation cycle including first and second intervals and responsive to $dx$- and $dy$-signals representative of $dx$- and $dy$-numerical increments comprising R-accumulator means for accumulating a numerically valued R-quantity, Y-storage means for storing a numerically valued Y-quantity, Y-arithmetic means coupled with said Y-storage means and responsive to said $dy$-signals for modifying said Y-quantity in accordance therewith, said Y-storage means and said Y-arithmetic means operatively connected to Y-accumulator means, logic means coupling said Y-accumulator means to said R-accumulator means and responsive to said $dx$-signal and $dy$-signal for transmitting said modified Y-quantity to said R-accumulator means for combination therein with said R-quantity during said first interval and for providing a correction quantity to said R-accumulator means for combination therein with the modified R-quantity during said second interval, and overflow means coupled to said R-accumulator means for providing signals representative of the overflow thereof in response to said combination of said Y-quantity with said R-quantity.

15. The integrator of claim 14 wherein during said first interval said Y-quantity is summed with said $dy$-increment and the sum is multiplied by said $dx$-increment before said modified Y-quantity is combined with said R-quantity.

16. The integrator of claim 14 wherein during said second interval said modified Y-quantity is algebraically summed with said $dy$-increment and stored for reinsertion during the succeeding first interval, and the corrected R-quantity is summed with one-half the product of the $dy$-increment and $dx$-increment.

17. An integrator of the character recited in claim 2 wherein said first and second intervals each comprise one arithmetic word with respect to said R-quantity.

18. An integrator of the character recited in claim 10 wherein said accumulated correction quantities provided by said correction storage means are algebraically added to said R-quantity during said second interval by said R-arithmetic means.

* * * * *